United States Patent
Goswami et al.

(10) Patent No.: US 11,681,918 B2
(45) Date of Patent: *Jun. 20, 2023

(54) COHORT BASED ADVERSARIAL ATTACK DETECTION

(71) Applicant: International Business Machines Corporation, Armonk, NY (US)

(72) Inventors: Gaurav Goswami, Bangalore (IN); Nalini K. Ratha, Yorktown Heights, NY (US); Sharathchandra Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 219 days.

This patent is subject to a terminal disclaimer.

(21) Appl. No.: 17/236,466

(22) Filed: Apr. 21, 2021

(65) Prior Publication Data

US 2021/0264268 A1 Aug. 26, 2021

Related U.S. Application Data

(63) Continuation of application No. 16/545,380, filed on Aug. 20, 2019, now Pat. No. 11,042,799.

(51) Int. Cl.
*G06N 3/08* (2023.01)
*G06N 20/00* (2019.01)
(Continued)

(52) U.S. Cl.
CPC ............. *G06N 3/08* (2013.01); *G06F 9/3867* (2013.01); *G06F 9/542* (2013.01); *G06F 18/22* (2023.01);
(Continued)

(58) Field of Classification Search
CPC ........ G06N 3/08; G06N 20/00; G06F 9/3867; G06F 9/542; G06K 9/6215; G06K 9/6292;
(Continued)

(56) References Cited

U.S. PATENT DOCUMENTS 10,628,943 B2 4/2020 Hsieh et al.
2015/0193693 A1 7/2015 Vasseur et al.
(Continued)

OTHER PUBLICATIONS

List of IBM Patents or Patent Applications Treated as Related, Apr. 21, 2021, 2 pages.
(Continued)

*Primary Examiner* — Juan A Torres
(74) *Attorney, Agent, or Firm* — Stephen J. Walder, Jr.; Jeffrey S. LaBaw

(57) ABSTRACT

Mechanisms are provided to provide an improved computer tool for determining and mitigating the presence of adversarial inputs to an image classification computing model. A machine learning computer model processes input data representing a first image to generate a first classification output. A cohort of second image(s), that are visually similar to the first image, is generated based on a comparison of visual characteristics of the first image to visual characteristics of images in an image repository. A cohort-based machine learning computer model processes the cohort of second image(s) to generate a second classification output and the first classification output is compared to the second classification output to determine if the first image is an adversarial image. In response to the first image being determined to be an adversarial image, a mitigation operation by a mitigation system is initiated.

20 Claims, 5 Drawing Sheets

(51) Int. Cl.
| | |
|---|---|
| *G06F 9/54* | (2006.01) |
| *G06F 9/38* | (2018.01) |
| *G06F 18/22* | (2023.01) |
| *G06F 18/25* | (2023.01) |
| *G06V 10/764* | (2022.01) |
| *G06V 10/80* | (2022.01) |
| *G06V 10/82* | (2022.01) |
| *G06V 10/44* | (2022.01) |

(52) U.S. Cl.
CPC ........... *G06F 18/254* (2023.01); *G06N 20/00* (2019.01); *G06V 10/454* (2022.01); *G06V 10/764* (2022.01); *G06V 10/809* (2022.01); *G06V 10/82* (2022.01)

(58) Field of Classification Search
CPC .. G06V 10/454; G06V 10/764; G06V 10/809; G06V 10/82
USPC ........................................................ 382/157
See application file for complete search history.

(56) References Cited

U.S. PATENT DOCUMENTS

| | | | |
|---|---|---|---|
| 2016/0142659 | A1 | 5/2016 | Shin et al. |
| 2017/0017857 | A1 | 1/2017 | Wolf et al. |
| 2018/0025272 | A1 | 1/2018 | Lin et al. |
| 2018/0144466 | A1 | 5/2018 | Hsieh et al. |
| 2018/0278647 | A1 | 9/2018 | Gabaev et al. |
| 2019/0138719 | A1 | 5/2019 | Sultana et al. |
| 2019/0188830 | A1 | 6/2019 | Edwards et al. |
| 2019/0318099 | A1 | 10/2019 | Carvalho et al. |
| 2020/0337648 | A1 | 10/2020 | Saripalli et al. |
| 2020/0410335 | A1* | 12/2020 | Gu .................... G06K 9/6256 |
| 2021/0056404 | A1 | 2/2021 | Goswami et al. |
| 2021/0067549 | A1 | 3/2021 | Chen et al. |
| 2021/0142450 | A1 | 5/2021 | Fan |

OTHER PUBLICATIONS

Athalye, Anish et al., "Obfuscated Gradients Give a False Sense of Security: Circumventing Defenses to Adversarial Examples", Proceedings of the 35th International Conference on Machine Learning, PMLR 80, 2018, arXiv: 1802.00420 v4 [cs.LG], Jul. 31, 2018, 12 pages.

Biggio, Battista et al., "Evasion attacks against machine learning at test time", In Joint European Conference on Machine Learning and Knowledge Discovery in Databases, 2013, arXIV: 1708.06131v1 [cs.CR] Aug. 21, 2017, 16 pages.

Binder, Alexander et al., "Layer-wise Relevance Propagation for Neural Networks with Local Renormalization Layers", arXiv:1604.00825 v1 [cs.CV], Apr. 4, 2016, 8 pages.

Carlini, Nicholas et al., "Adversarial Examples Are Not Easily Detected: Bypassing Ten Detection Methods", Proceedings of the 10th ACM Workshop on Artificial Intelligence and Security (AISec'17), Nov. 3, 2017, submitted copy from arXIV: 1705.07263v2 [cs.LG], Nov. 1, 2017, 12 pages.

Carlini, Nicholas et al., "Towards Evaluating the Robustness of Neural Networks", 2017 IEEE Symposium on Security and Privacy (SP), arXIV: 1608.04644v2 [cs.CR] Mar. 22, 2017, 19 pages.

Chun, Young Deok et al., "Content-Based Image Retrieval Using Multiresolution Color and Texture Features", IEEE Transactions on Multimedia, vol. 10, No. 6, Oct. 2008, pp. 1073-1084.

Feinman, Reuben et al., "Detecting adversarial samples from artifacts", arXiv:1703.00410, Nov. 2017, 9 pages.

Goodfellow, Ian J. et al., "Explaining and Harnessing Adversarial Examples", Published as a conference paper at ICLR 2015, arXIV: 1412.6572v3 [stat.ML] Mar. 20, 2015, 11 pages.

Guo, Chuan et al., "Countering Adversarial Images Using Input Transformations", arXIV: 1711.00117v3 [cs.CV] Jan. 25, 2018, 12 pages.

High, Rob, "The Era of Cognitive Systems: An Inside Look at IBM Watson and How it Works", IBM Corporation, http://ip.com/pdf/redbook/REDP495500.pdf, Dec. 12, 2012, 16 pages.

Mei, Shike et al., "The Security of Latent Dirichlet Allocation", 18th International Conference on Artificial Intelligence and Statistics (AISTATS), May 9-12, 2015, pp. 681-689.

Metzen, Jan H. et al., "On detecting adversarial perturbations", Published as a conference paper at ICLR, arXiv: 1702.04267, Feb. 2017, 12 pages.

Nguyen, Anh et al., "Deep Neural Networks are Easily Fooled: High Confidence Predictions for Unrecognizable Images", In Computer Vision and Pattern Recognition (SVPR'15), IEEE, Jun. 7-12, 2015, arXIV: 1412.1897v4 [cs.CV] Apr. 2, 2015, 20 pages.

Selvaraju, Ramprasaath R et al., "Grad-CAM: Visual Explanations from Deep Networks via Gradient-Based Localization", ICCV, 2017, arXIV: 1610.02391v3 [cs.CV] Mar. 21, 2017, 24 pages.

Szegedy, Christian et al., "Intriguing properties of neural networks", ICLR, 2013, arXIV: 1312.6199v4 [cs.CV] Feb. 19, 2014, 10 pages.

Tistarelli, Massimo et al., "On the Use of Discriminative Cohort Score Normalization for Unconstrained Face Recognition", IEEE Transactions on Information Forensics and Security, vol. 9, Issue: 12, Oct. 8, 2014, pp. 1-13.

Xu, Weilin et al., "Feature Squeezing: Detecting Adversarial Examples in Deep Neural Networks", In Network and Distributed Systems Security Symposium (NDSS) Feb. 2018, arXIV: 1704.01155v2 [cs.CV] Dec. 5, 2017, 15 pages.

Yuan, Michael J., "Watson and Healthcare, How natural language processing and semantic search could revolutionize clinical decision support", IBM Corporation, developerWorks, http://www.ibm.com/developerworks/industry/library/ind-watson/, Apr. 12, 2011, 14 pages.

Zhang, Yimeng et al., "Image Retrieval with Geometry-Preserving Visual Phrases", The 24th IEEE Conference on Computer Vision and Pattern Recognition, CVPR 2011, Jun. 20-25, 2011, pp. 809-816.

Zhou, Bolei et al., "Learning Deep Features for Discriminative Localization", Proceedings of the IEEE Conference on Computer Vision and Pattern Recognition, Jun. 26-Jul. 1, 2016, pp. 2921-2929.

* cited by examiner

COHORT BASED ADVERSARIAL ATTACK DETECTION

BACKGROUND

The present application relates generally to an improved data processing apparatus and method and more specifically to mechanisms for providing a cohort based adversarial attack detection mechanism.

Deep learning is part of a broader family of machine learning methods based on learning data representations as opposed to task-specific algorithms. Some representations are loosely based on interpretation of information processing and communication patterns in a biological nervous system, such as neural coding that attempts to define a relationship between various stimuli and associated neuronal responses in the brain. Research attempts to create efficient systems to learn these representations from large-scale, unlabeled data sets. Labeled data may also be provided for supervised deep learning.

Deep learning architectures such as deep neural networks, deep belief networks, and recurrent neural networks, have been applied to fields including computer vision, speech recognition, natural language processing, audio recognition, social network filtering, machine translation, and bioinformatics where they produced results comparable to, and in some cases superior to, human experts.

Neural network based deep learning is a class of machine learning algorithms that use a cascade of many layers of nonlinear processing units for feature extraction and transformation. Each successive layer uses the output from the previous layer as input. The algorithms may be supervised or unsupervised and applications include pattern analysis (unsupervised) and classification (supervised). Neural network based deep learning is based on the learning of multiple levels of features or representations of the data with higher level features being derived from lower level features to form a hierarchical representation. The composition of a layer of nonlinear processing units of the neural network used in a deep learning algorithm depends on the problem to be solved. Layers that have been used in deep learning include hidden layers of an artificial neural network and sets of complicated propositional formulas. They may also include latent variables organized layer-wise in deep generative models such as the nodes in deep belief networks and deep Boltzmann machines.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, the at least one memory comprising instructions which are executed by the at least one processor to specifically configure the at least one processor to implement a cohort adversarial input detection (CAID) system and a machine learning computer model. The method comprises processing, by the machine learning computer model, input data representing a first image to generate a first classification output and generating, by an image cohort search and retrieval (ICSR) engine of the CAID system, a cohort of one or more second images that are visually similar to the first image based on a comparison of visual characteristics of the first image to visual characteristics of images in an image repository. The method further comprises processing, by a cohort-based machine learning computer model of the CAID system, the cohort of one or more second images to generate a second classification output and comparing, by an adversarial input detection (AID) engine of the CAID system, the first classification output to the second classification output. Moreover, the method comprises determining, by the AID engine, whether or not the first image is an adversarial image based on results of the comparing and, in response to a determination that the first image is an adversarial image, initiating performance of a mitigation operation by a mitigation system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
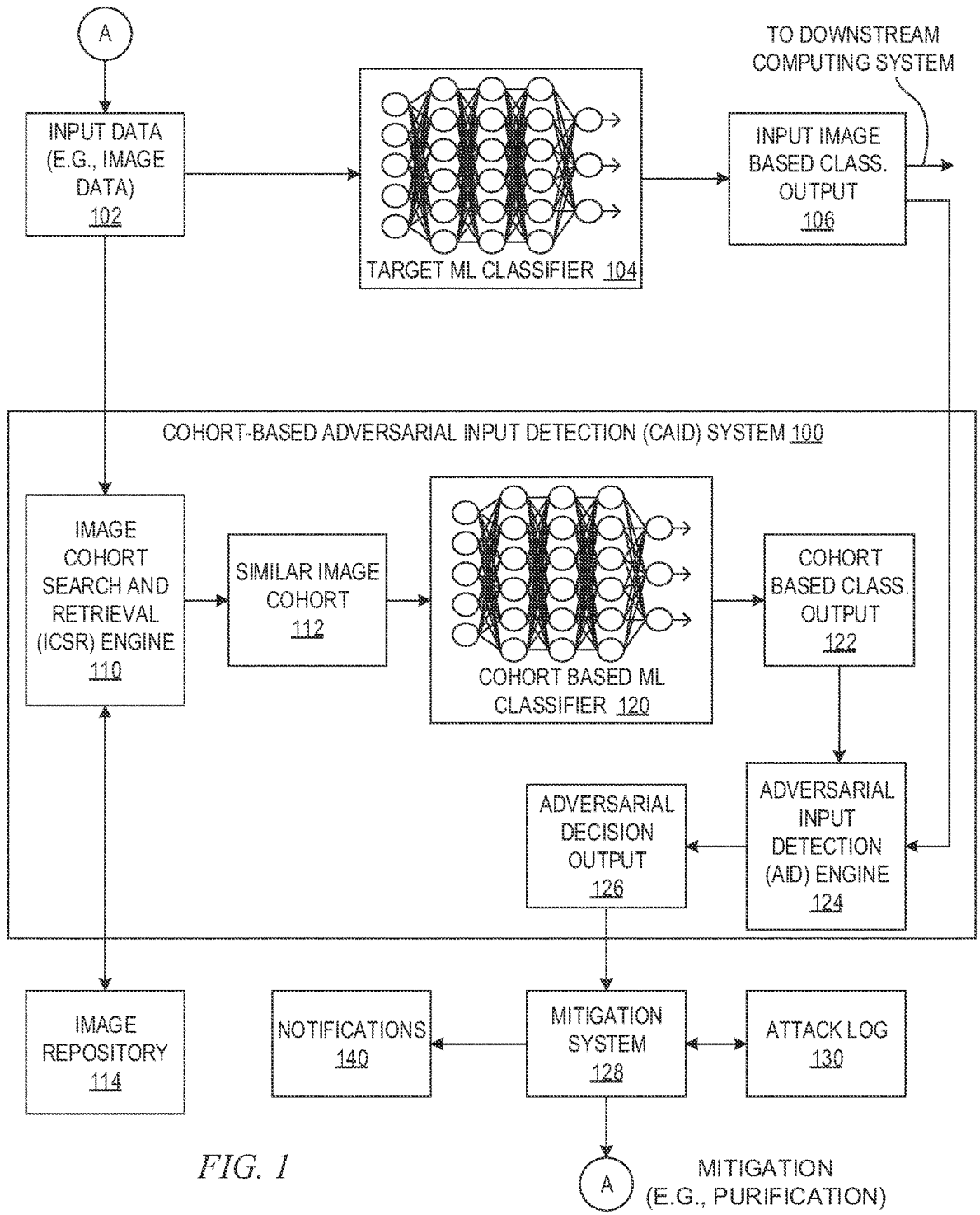
FIG. 1 is an example block diagram illustrating the primary operational elements of an improved computer tool, referred to as a cohort-based adversarial input detection (CAID) system, in accordance with one illustrative embodiment.

Various cognitive systems may utilize trained models, such as trained deep learning models that may include neural networks or the like, to perform their cognitive operations.

For example, a deep learning and/or neural network implemented model may be used to provide image analysis, facial recognition, fingerprint or retinal image recognition, speech pattern analysis, or the like, for a cognitive security system, such as an image recognition surveillance system, a biometric authentication system, etc. Often times, such deep learning/neural networks, and other types of machine learning or cognitive models, are utilized in or with cognitive systems to perform a classification operation, upon which the cognitive system operates to perform a cognitive operation, e.g., classifying an input into one of a plurality of predetermined classifications (classes) which is then used to perform a more complex analysis or reasoning operation using cognitive system mechanisms. For example, an image recognition system may utilize a deep learning and/or neural network mechanism to classify an image of an animal into one of a large set of potential animal classifications, e.g., dog, cat, zebra, etc. Facial recognition systems may be used to take features extracted from an input image and use them to classify the image as one of a plurality of known persons.

The robustness of many machine learning systems, especially those based on deep learning, can be compromised by adversarial attacks. For example, attackers may attempt to thwart such systems by performing evasion attacks, such as gradient-based attacks. An evasion attack on a cognitive system, e.g., on the neural network or other cognitive or machine learning model implemented by the cognitive system, involves the attacker attempting to fool the model to misclassify a manipulated input. For example, an attacker may make almost imperceptible manipulations on input data to generate adversarial input, where an adversarial input is an input formed by applying small, but intentional, perturbations to data samples from a data set (where the term "data set" as used herein refers to a set of one or more data samples), such that the perturbed input results in the computing model, e.g., deep learning neural network (DNNs), convolutional neural networks (CNNs), or other machine learning computing model, outputting an incorrect answer with high confidence. The adversarial input will cause the computing model (hereafter assumed to be a convolutional neural network (CNN), as an example) to misclassify the input and thus, malfunction, resulting in a breach of security. The misclassification that the adversarial input intends to cause is often referred to as the "target" label (t) generated by the computing model based on the input data, whereas the correct or "true" label ($t_0$) is the label that the computing model should output for the original (non-perturbed) input data. Such misclassification may prevent the computing model, and thus the system, from correctly classifying valid inputs as valid, or allow invalid inputs to be incorrectly classified as valid. For example, an attacker attempting to fool a facial recognition neural network may first obtain access to the trained neural network and based on an analysis of the trained neural network, generate adversarial inputs by purposefully and algorithmically adding small imperfections to their appearance, and thereby generate an adversarial input, in an attempt to fool the facial recognition into misclassifying the attacker as an authorized individual. These attacks can be embedded and manifested physically in the form of accessories that the attacker can wear (in the case of facial recognition), a near-transparent film that can be applied on top of a sensor (in the case of most camera/sensor based applications where the sensor is physically accessible), or a similar method applied to other real-world objects that are then captured by a camera and processed (street signs may be vandalized and then misread by self-driving cars).

Such evasion attacks, e.g., Fast Gradient Step Method (FGSM) or Iterative Fast Gradient Step Method (IFGSM) and the like, tend to be classifiable as white box attacks and are dependent upon the attacker identifying a correct gradient of the loss surface of the neural network or other cognitive or machine learning model. The loss surface, also referred to as the loss function or cost function, in the context of machine learning, neural networks, and cognitive system operations, is a function that represents the price paid for inaccuracy of predictions, e.g., the cost of inaccuracy in a classification prediction. A white box attack involves the attacker having full access to the cognitive system and the attacker may in fact be a user of the cognitive system, as opposed to black box attacks where the attacker does not have access to the endpoints of a secure transaction, or a gray box attack in which the attacker is able to interact with one or more of the endpoints via observation and/or alteration of system parts and processes. Such white box attacks are mostly based on gradients, as described in Goodfellow et al., "Explaining and Harnessing Adversarial Examples," ICLR 2015, Mar. 20, 2015. For example, the JSMA attack is a type of white box attack that greedily modifies one pixel at a time until the image is classified incorrectly. The FGSM attack takes a single step, for all pixels, in the direction of the gradient. The Carlini and Wagner (C&W) attack uses gradient descent to optimize a custom loss function. Other types of attacks include the elastic-net attack on DNNs (EAD), structured (Str) attacks, and the like.

In order to harden computer models, such as those implemented in cognitive systems, neural networks, or other machine learning models, against such attacks, adversarial inputs may be generated during training of these systems, networks or models, to train these systems, networks, or models to be less sensitive to the adversarial perturbations implemented by these attacks. However, these approaches have been demonstrated to be fragile to adaptive adversarial attacks, such as described in Athalye et al., "Obfuscated Gradients Give a False Sense of Security: Circumventing Defenses to Adversarial Examples," arXiv preprint arXiv: 1802.00420 (2018).

It is important to be able to design machine learning systems that are resistant to adversarial attacks such as the evasion attacks described above. While there are several defenses against adversarial attacks that have been proposed, they all share certain common drawbacks. For example, such proposed defenses either:
1. Require white-box access to the target machine learning (ML) system (i.e., the machine learning system that is being protected);
2. Require access to adversarial samples generated by the target attack (i.e. the type of attack that the defense mechanism needs to guard the target ML system against);
3. Rely on particular types of layers (dropout, convolutional, etc.) to be present in the target ML system;
4. Require modification of the existing target ML system;
5. Require processing of the input by the defense mechanism regardless of whether the input is clean (non-attacked) or adversarial, thereby sacrificing performance on clean (non-attacked) input;
6. Process images in the feature space of the target ML system where the impact of the attack is the highest (by design); or
7. Require modification of the training process, thereby needing re-training of the target ML system as per the modified training process.

The illustrative embodiments described herein addresses many of these drawbacks by providing a cohort based adversarial input detection mechanism which relies on the image space of the input image, as well as the feature space, to actually detect the adversarial input (or adversarial attack). By "space" what is meant is the high-dimensional vector space where each image lies as a singular point. The image space is one in which raw pixel values, along with a distance metric, may be compared. The feature space is distinct and different from the image space as derivative features are extracted by each subsequent layer that project the input image into a different feature space each time.

The mechanisms of the illustrative embodiments have been devised based on the observation that all quasi-imperceptible adversarial attacks, i.e. those attacks which add minor perturbations to the original (clean) image so that the attacked image (the version with perturbations) is not distinguishable visually from the original (clean or non-attacked) image, involve an optimization stage where the distance of the attacked version of the image, from the original (clean) version of the image, is very high in the feature space of the target ML system while keeping the distance in the image space very low, i.e. drawback 6 in the above listing. Existing defense mechanisms have focused on detecting attacks in the feature space of the target ML system, where the target ML system is most confused about the nature of the adversarial image by design. That is, the adversarial attacks attempt to make significant changes in the feature space while having imperceptible changes in the image space. Thus, if one is to devise a defense mechanism that operates in only the same feature space, not all of these attacks may not be properly identified as they have been specifically designed to thwart such defenses. For example, such defenses may only look for changes in the feature space that are greater than a particular threshold and yet there may be other attacks that fall under that threshold and still are significant enough to cause a misclassification of an input image.

To address this issue and provide a solution to the computer based problem of adversarial attacks on machine learning computer systems designed to perform image classification and/or image recognition operations, the illustrative embodiments provide mechanisms for training and utilizing multiple classifiers to classify an input image and utilizing the differences, if any, of the output classifications of these classifiers as indicative of whether or not the input image is an adversarial input image, i.e. an attacked image, or not. In particular, in some illustrative embodiments, a first machine learning (ML) classifier, e.g., a deep learning neural network (DNN), a convolutional neural network (CNN), or other ML model based system, operates on the input image to generate a first classification of the input image based on the features of the input image extracted from the input image in a feature space of the first ML classifier. A second ML classifier operates on one or more similar images, identified through a similar image search operation to generate a cohort of similar images, and thus, operates to classify one or more similar images to the input image, where the similarity is determined in the image space. If the input image has not been attacked and thus, is not adversarial, then the first classification output generated based on the input image and the second classification output generated based on one or more similar images in a cohort of similar images should be substantially the same. If the input image has been attacked and thus, is adversarial, then the first classification output generated based on the input image and the second classification output generated based on the one or more similar images in the cohort of similar images should be substantially different. Thus, by comparing the classification outputs from the first and second ML classifiers, one can determine based on both the features pace of the first ML classifier, and the image space of the second ML classifier, whether or not the input image is an adversarial image as part of an attack on the first ML classifier or not and may take appropriate responsive action, as discussed hereafter.

With the mechanisms of the illustrative embodiments, a first ML classifier and a second ML classifier are trained through machine learning processes to perform proper classification of input images. However, the particular input images that the training is performed upon are different for the two classifiers. That is, during training of a target machine learning classifier (i.e. the classifier that is being protected from adversarial inputs), the feature space of the input image is used by the target machine learning (ML) classifier which seeks to classify the input image into one of a plurality of predefined classifications. For purposes of illustration, it will be assumed that the target ML classifier is implemented as a neural network model, e.g., a deep learning neural network (DNN) model, convolutional neural network (CNN) model, or the like.

During the training of the target ML classifier, particular features of the input image, e.g., pixel values, are extracted and fed into the target ML classifier as inputs at input nodes of the target ML classifier. The convolutional layers of nodes, or hidden layers of nodes, operate on these extracted features to generate scores, based on weightings assigned to connections between the nodes, which indicate probabilities that the particular combination of extracted features represent particular classes of images. The scores are combined at an output layer of nodes to generate the final probabilities that the input image correctly is classified into corresponding predefined classifications, e.g., there may be an output node for each predefined classification and the output nodes value represents the probability that the input image is properly classified in the corresponding classification. Based on these outputs, a final output classification may be generated, e.g., a highest probability node is selected as the final output classification for the input image.

Thus, the trained target ML classifier generates outputs classifying the input image into one of a set of predetermined classifications. If the input image is adversarial, this target ML classifier may generate a misclassification of the input image. That is, the adversarial input may make visually imperceptible perturbations to the image that visually seem insignificant, yet in the feature space are significant enough to cause the probability values to be calculated such that a target classification, different from the true classification, is generated, e.g., an image of a "cat" is instead classified as an image of a "dog". It is important to known when the input image is likely adversarial so that downstream systems, or even users, may know whether they can rely on the classification generated by the target ML classifier or not. Also, it is important to know when the input image is likely adversarial so that corrective action can be taken by users and/or downstream systems so at to attempt to mitigate the attack if possible.

In order to provide a mechanism for detecting when an input image is likely adversarial or not, the illustrative embodiments further implement an image cohort search and retrieval (ICSR) engine, a cohort based ML classifier, and an adversarial input detection (AID) engine. At a same time that the target ML classifier is being trained, the cohort based ML classifier is trained to closely replicate the decision probabilities of the target ML classifier using a cohort of each input image obtained using the ICSR engine that identifies similar images to the input image. That is, rather than generating the classification of the original input image, the cohort based ML classifier generates a classification based on features extracted from a cohort of one or more similar images, where the similarity of the image is determined in the image space as opposed to the feature space of the target ML classifier. Thus, through the training operation, correct classifications of input images that have not been attacked should generate probability values that are closely approximated by the probability values output by the cohort based ML classifier. For example, if the input image is of a cat, then the target ML classifier should output a highest probability value in association with a classification of "cat", assuming that the input image is not an adversarial image. Similarly, if the cohort based ML classifier is trained on a similar image of a cat, but not the same input image of a cat as the target ML classifier, then the cohort based ML classifier should also generate a similar highest probability value in association with a classification of "cat." Such machine learning training may involve the adjustment of weights and other operational parameters of the target ML classifier and the cohort based ML classifier to reduce loss and error in the classification outputs as is generally known in the art.

In one illustrative embodiment, which will be used as the primary example embodiment described herein, the two ML classifiers are trained independent of each other. The only dependency during training of the ML classifiers is with regard to the identification of similar images that are included in the similar image cohort. That is, the target ML classifier is trained independent of the cohort based ML classifier, on the input image. The cohort based ML classifier is trained independent of the target ML classifier, but instead is trained based on similar images to the input image. The only linking between these classifiers during training is the ICSR engine which uses the input image to the target ML classifier as a basis for searching for and retrieving similar images from an image repository for including in a cohort of similar images that are then used to independently train the cohort based ML classifier. As these are similar images to the input image, assuming no adversarial input, the independent training of the cohort based ML classifier should generate a similar correct classification as that of the target ML classifier, i.e. for the input image of a cat, both classifiers should generate a correct classification of a "cat" even though they are trained on different input images, as the images are visually similar.

In another illustrative embodiment, rather than training the two ML classifiers independently, the training of the target ML classifier and the training of the cohort based ML classifier may be dependent on each other by using the probability values for classifications generated by the target ML classifier to influence the weights and other operational parameters used by the cohort based ML classifier so as to cause the cohort based ML classifier to generate probability values for the correct classification that are similar to the probability values of the target ML classifier. Thus, similar to the way in which a loss function may be used to modify the operational parameters and weights used by the target ML classifier, the outputs generated by the target ML classifier may also be used in the loss function of the cohort based ML classifier to modify the cohort based ML classifier's parameters and weights.

The ICSR engine uses visual characteristics of the input image to search for and retrieve other images from the image repository that have similar visual characteristics to the input image. For example, the ICSR engine may analyze, pixel by pixel, the input image to extract the characteristics of each pixel, e.g., values representing color, intensity, or other feature vector values representative of a pixel in a digital image. These characteristics may be used to compare to other images, identify regions, contours, etc. within digital images which are then compared to other digital images, or the like, so as to identify similar images. A similarity measure, or distance measure, may be calculated between two digital images using these extracted characteristics and the similarity measure/distance metric may be compared to one or more threshold values to determine whether the compared images are sufficiently similar to one another. Various algorithms exist to perform similarity evaluations between digital images. Any currently known or later developed mechanism for identifying similar digital images may be used with the mechanisms of the illustrative embodiments without departing from the spirit and scope of the present invention.

Once the target ML classifier and the cohort based ML classifier have been independently trained to classify input images, the classifiers may be deployed as a pair of classifiers whose outputs are compared by an adversarial input detection (AID) engine. During operation, the input image may be received from an image source and the ICSR engine may generate a cohort of similar images. While the target ML classifier performs its operations to classify the input image, the cohort based ML classifier performs classification operations on one or more similar images in the cohort of similar images. In the case of the input image being an adversarial image as part of an attack where the perturbations are not visually perceptible, the cohort of similar images will not change drastically from a cohort of similar images for the clean image, i.e. the non-attacked image. This ensures that the classification decision of the cohort based ML classifier does not change from that obtained using the clean image.

By comparing the classification decisions or outputs of the target ML classifier and the cohort based ML classifier, it can be determined whether the input image has been attacked and thus, is adversarial, or is a clean (non-attacked) image. The AID engine performs this comparison to determine if there is a difference in the classification decisions of the two ML classifiers. If there is not a difference, based on the fact that the cohort images should not change the cohort based ML classifier's output from the output that would be obtained by processing a clean image, then it can be determined that the input image is a non-attacked, i.e. non-adversarial, image. If there is a difference, then the input image likely contains perturbations causing the target ML classifier to misclassify the input image and thus, the input image has been attacked or is adversarial.

The AID engine may generate an output indicating whether or not the input image is adversarial or has been attacked. This output may be used to initiate a mitigation operation by a downstream mitigation system so as to reduce the negative effects of an adversarial input to the target ML classifier. This mitigation operation may take many different forms depending on the desired implementation. For example, the mitigation operation may be the sending of a notification message to an administrator computing device so as to inform a human administrator of the adversarial input. This mitigation operation may further involve logging the adversarial input and features of the adversarial input, e.g., source of the adversarial input image, misclassification generated by the target ML classifier, and other characteristics, in a log data structure which may be analyzed at a later time so as to inform a system administrator, designer of the target ML classifier, or other authorized personnel, of the adversarial input image so that they may act upon it based on their policies.

In some illustrative embodiments, in response to detecting that the input image is likely adversarial based on a difference in the outputs of the target ML classifier and the cohort based ML classifier, the mitigation system may reject the input image, discard the results of any target ML classifier processing of the input image, and sending a request to a source of the input image to provide a different input image while also logging the adversarial input for reference. The rejection of the input image and/or discarding of the results of the target ML classifier may be performed prior to the results of the target ML classifier being provided to a downstream system that uses the classification results to perform a computer based cognitive operation, e.g., an image recognition framework that performs image recognition operations based on the classification results generated by the target ML classifier. Alternatively, the rejection and/or discarding may be performed after the results have been provided to the downstream system, such that a notification may be sent to the downstream system to cause it to discard its own results generated based on operations performed using the results of the target ML classifier as a basis.

The mitigation system may evaluate the log entries to determine if a large number (equal to or above a predetermined threshold) of adversarial input images are received from a same source. If a same source is the source of a large number of adversarial inputs, then mitigation actions may include blocking any further inputs from that source, notifying a system administrator of the source of the adversarial inputs, notifying a government or oversight organization of the adversarial inputs and the attack, or the like. In performing such notification, automatic computer based communications may be initiated that includes data structures representing the logged information regarding adversarial inputs, the source(s) of the adversarial inputs, and the overall attack. The notified parties may then take appropriate actions to address the source of the multiple attacks.

In still other illustrative embodiments, the mitigation operation may involve automatically performing operations to attempt to automatically correct or mitigate the adversarial attack. For example, a purification operation may be performed such as described in commonly assigned and co-pending U.S. patent application Ser. No. 16/452,709, entitled "Detecting and Purifying Adversarial Inputs in Deep Learning Computing Systems," filed Jun. 26, 2019, which is hereby incorporated herein by reference. As described in this commonly assigned application, a discriminative region of the input image is determined and the pixels in the discriminative region are modified so as to minimize the perturbations in this discriminative region and thus, minimize the effect of adversarial perturbations on the classification generated by the target ML classifier. Following such purification, the purified image may be resubmitted as an input to the target ML classifier. In addition, the ICSR engine may generate a cohort of images based on the purified image and the process as described above repeated. Assuming that the purification of the input image was sufficient, the target ML classifier and the cohort based ML classifier will generate a same classification output and thus, the purified input image will not be identified as adversarial.

It should be appreciated that these are only examples of potential mitigation actions that may be performed based on the detection of an adversarial input using the mechanisms of the illustrative embodiments. Other mitigation operations, as will become apparent to those of ordinary skill in the art in view of the present description, may also be implemented without departing from the spirit and scope of the present invention.

Thus, the illustrative embodiments provide mechanisms for automatically detecting adversarial inputs that are part of an attack on a target ML classifier. The automatic detection is based on both the feature space of the target ML classifier and an image space of visually similar images to the input image sent to the target ML classifier. Because the evasion attacks make small visually imperceptible changes in the image space between the original image and the adversarial image, yet large enough changes in the feature space to cause a misclassification, by using visually similar images as a check of the classification of the target ML classifier, the mechanisms of the illustrative embodiments are able to identify adversarial attacks without the drawbacks of known mechanisms that operate in the feature space.

The mechanisms of the illustrative embodiments have multiple advantages over the known defense mechanisms. The mechanisms of the illustrative embodiments do not need white-box access to the target ML classifier, do not need access to any adversarial inputs during training of the target ML classifier, and can scale to any quasi-imperceptible attack method. It should be appreciated that many existing defensive algorithms need a high number of adversarial input images during training to learn how to defend against the algorithms used to generate adversarial inputs. They only perform well on the inputs generated by these algorithms (which they have seen during training) and fail to generalize well against other adversarial algorithms due to the different behavior of an unseen algorithm in the feature space. The illustrative embodiments do not have this problem since all adversarial attacks are unseen for it and it is not dependent on the adversarial attack algorithm.

The mechanisms of the illustrative embodiments do not rely on particular types of layers (dropout, convolution, etc.) to be present in the target ML classifier since it operates independent on the internal functioning of the target ML classifier. It can be appreciated that a ML classifier may be a deep learning-based classifier or a different type of classifier having a different architecture from a deep learning-based classifier. Even in the category of deep-learning based classifiers, there are different types: recurrent neural networks, autoencoders, convolutional neural networks etc. The type and function of each layer in these networks can also vary. Existing algorithms operate with networks that have particular types of layers in them. Therefore, they are not "compatible" with networks that lack those layers in their architecture. Since the illustrative embodiments do not rely on any of the "internal functioning" of the classifier, i.e. types of layers, type of network, type of classifier, it can be applied to defend any type of ML classifier, not just limited to a type of neural network or even neural networks as a whole. There is research that shows other classic ML algorithms, such as logistic regression, are also susceptible to adversarial attack and these are also valid target classifiers to be protected by the proposed algorithm.

The mechanisms of the illustrative embodiments do not need to modify the existing target ML classifier and do not involve processing the input, thereby not requiring any sacrifice in the performance of the target ML classifier on clean (non-attacked) images. That is, the "check" implemented by the cohort based ML classifier and AID engine is done in parallel with the operation of the target ML classifier and thus, unless an adversarial input is identified, the performance of the target ML classifier is unaffected. As noted above, the mechanisms of the illustrative embodiments operate in the image space where the impact of the adversarial input is the lowest. Moreover, the mechanisms of the illustrative embodiments do not need to modify the training process of the target ML classifier, thereby not needing any retraining of the target ML classifier. Thus, the mechanisms of the illustrative embodiments address all of the drawbacks of known defense mechanisms that operate in the feature space as noted above.

It should be appreciated that throughout this description the term "mechanism" is used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims makes use of the terms "a", "at least one of", and "one or more of" with regard to particular features and elements of the illustrative embodiments. It should be appreciated that these terms and phrases are intended to state that there is at least one of the particular feature or particular element present in the illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," as used herein with regard to describing embodiments and features of the invention, is not intended to be limiting of any particular implementation for accomplishing and/or performing the actions, steps, processes, etc., attributable to and/or performed by the engine. An engine may be software, hardware and/or firmware or any combination thereof that performs the specified functions including, but not limited to, any use of a general and/or specialized processor in combination with appropriate software loaded or stored in a machine readable memory and executed by the processor to thereby specifically configure the processor to perform the specified functions. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

Also, where the present specification references data structures by a descriptor, such as an "image" as opposed to an "image data structure", it is to be understood that the reference is to a data structure that represents the corresponding descriptor, e.g., an image is a data structure representing an image. Thus, when the present description states that a computer operation is performed on such a descriptor, e.g., "processing an image" or "performing image classification on the image," it should be appreciated that the computer operation is being performed with regard to the data structure(s) that represents that descriptor since computers and "data" processing systems can only operate on data structures. Such references are not intended to refer to abstract concepts, but rather concrete data structures stored and processed within one or more computing devices, storage devices/systems, and/or data processing systems.

In addition, it should be appreciated that the present description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is an example block diagram illustrating the primary operational elements of an improved computer tool, referred to as a cohort-based adversarial input detection (CAID) system, in accordance with one illustrative embodiment. The elements shown in FIG. 1 may be implemented in specifically configured hardware configured to perform the associated operations of the elements, software executed on hardware where the software is specifically configured to perform the associated operations of the elements when executed by the hardware, or any combination of such specially configured hardware and executed software. It should be appreciated that, in the case of software executed on hardware, various computer code can be generated to achieve the operations set forth herein in view of the present description, and the illustrative embodiments are not limited to any one specific computer code implementation. Moreover, it should be appreciated that other hardware/software elements may be provided to facilitate basic computer functions, such as control, messaging, data transfer, and the like, both within the computing or data processing system and with external computing devices.

FIG. 1 illustrates the primary operational elements of one illustrative embodiment when deployed after the independent training of the target machine learning model 104 and the cohort-based machine learning model 120. The independent training of these models 104, 120 will be described hereafter with regard to FIG. 2. The independent training of the models 104, 120 does not require the operation of the adversarial input detection (AID) engine 124 or mitigation system 128 but does require additional training logic and ground truth metadata to facilitate the training as will be described hereafter.

As shown in FIG. 1, the CAD system 100 operates in conjunction with a target machine learning (ML) model (target ML classifier) 104, which may be any known or later developed ML computer model, such as a deep neural network (DNN), convolutional neural network (CNN), or any other type of machine learning classifier where there is at least black box access to the machine learning model's decisions, preferably, but not necessarily, at the scoring level of the machine learning model where there is access to the probability values generated by the machine learning model for the various classifications. The target ML model 104 is a computer model that executes on one or more computing devices in order to perform a cognitive evaluation of input data and generate an output, which may be a decision output, a classification output, or the like. The target ML model 104 may be part of a larger cognitive computing system, such as an image recognition system, decision support system, or the like, that performs further cognitive evaluations and operations based on the results generated by the target ML model 104.

The term "cognitive" as it is used herein refers to the approximation, by a computing device, of human thought processes by emulating these thought processes in computer logic executed by a computer. It should be appreciated that even though the computing device attempts to approximate or emulate the human thought processes, the way that computers operate is significantly different than the human mind due to the nature of computers requiring explicit instructions in order to perform operations. For example, while a human mind may see a picture of a cat and be able to intuitively know that the picture is one of a cat, a computing device performing image recognition operations, using a cognitive computing system, must have logic and be trained to recognize certain characteristics of the image data as representative of a cat and properly classify it as such. Thus, while human thought processes may be emulated, the computer operation is a completely different operation from that of a human mind, even though the result may appear to be similar. Ingenuity is required to make a computing device emulate human thought processes due to this fundamental difference in the way a human mind and a computer operate.

The CAID system 100 provides a mechanism for detecting adversarial inputs that are part of an attack on the target ML model 104 and then initiate mitigation operations to minimize the effects of such attacks. For purpose of the present description, it is assumed that the target ML model 104 is configured to perform an image classification operation which uses artificial intelligence mechanisms, such as one or more neural networks, e.g., DNNs, CNNs, or the like, to classify input image data into one of a plurality of predefined image classifications by calculating probabilities associated with each of the predefined image classifications indicating a probability that the input image is properly classifiable in the corresponding predefined image classification (or image class). This image classification operation may be part of a larger cognitive computing operation, such as an image recognition operation, decision support operation, or the like, performed by a cognitive computing system with which the target ML classifier 104 operates.

It should be appreciated that other operations that may be performed by a machine learning model, other than classification, may also be implemented with the mechanisms of the illustrative embodiments in addition to, or in replacement of, the image classification operation without departing from the spirit and scope of the present invention. Any operation in which a machine learning model takes an image as input and provides an output which is vulnerable to an image space imperceptible attack may make use of the mechanisms of the illustrative embodiments. Image space difference and feature space difference between the original and adversarial image would be satisfied since any model that projects the image into a feature space before trying to ascertain information about it will follow a similar pattern.

The target ML model or classifier 104 is trained through an independent machine learning based training operation to classify images into a predetermined set of image classifications and the cohort based ML model or classifier 120 of the CAID system 100 is also trained through an independent machine learning training operation to classify images into the same predetermined set of image classifications. The cohort based ML classifier 120 is trained based on images that are similar to training images used to train the target ML classifier 104. During runtime operation, after training of the classifiers 104, 120, the cohort based ML classifier 120 operates on images that are similar to the input image 102 but are retrieved from an image repository 114. The similar images retrieved from the image repository 114 are guaranteed to be clean (non-attacked or non-adversarial) images because they are chosen to be part of the image repository 114 and hence adversarial images would not be selected for inclusion in the image repository 114 or an image repository 114 that has adversarial images would not be used. Thus, the cohort based classification 122 output by the cohort based ML classifier 120 should be significantly similar, i.e. within a given tolerance or threshold difference, of the input image based classification 106 generated by the target ML classifier 104 in the absence of an adversarial input. In the case of an adversarial input, the two classification outputs 106, 122 will have a significant difference equal to or above this given tolerance or threshold.

The adversarial input detection (AID) engine 124 operates to compare the input image based classification 106 with the cohort based classification 122 during runtime operation so as to detect whether or not the input data 102 likely is an adversarial input having perturbations intended to cause the target ML classifier 104 to misclassify the input image of the input data 102. The adversarial decision output 126 generated by the AID engine 124 may be provided to a mitigation system 128 which may perform any of a plurality of mitigation operations including logging the adversarial input as part of an attack in the attack log 130, sending appropriate notifications 140, and/or performing automated mitigation operations such as purification of the input data 102.

Thus, as shown in FIG. 1, input data 102 is received, which is assumed for this example embodiment to represent a digital image that is to be classified by the target ML classifier 104. The input data 102 is input to the target ML classifier 104 and is also provided to an image cohort search and retrieval (ICSR) engine 110 of the CAID system 100. The target ML classifier 104 performs image classification operations on features extracted from the input data 102 to generate an input image based classification 106. The performance of image classification operations using neural networks is generally known in the art and thus, a more detailed description is not provided herein. The resulting input image based classification output 106 may be provided as input to the CAID system 100, and more specifically to the adversarial input detection engine 124 of the CAID system 100, as well as provided to downstream computing systems, such as image recognition systems, cognitive computing systems, such as the IBM Watson™ cognitive computing system, or the like. It should be appreciated that, in some illustrative embodiments, these downstream computing systems may be downstream applications or software components executing in a same data processing system in which the target ML classifier 104 is executing. In other illustrative embodiments, these downstream computing systems may be external to the data processing system implementing the target ML classifier 104 and may in fact be remotely located from the target ML classifier 104 and accessible by the data processing system implementing the target ML classifier 104 via one or more data networks.

The input image based classification output 106 may be a vector output comprising values output by each of the output nodes of the target ML classifier 104, e.g., the output nodes of a neural network model implemented by the target ML classifier 104. Each value in the vector output represents a probability that the corresponding class is a correct classification for the input data 102. For example, if the target ML classifier 104 is classifying an input image 102 of an animal, the predefined classifications may include, for example, cat, dog, horse, cow, etc. Each output node of the neural network model may output a probability value for a corresponding one of these classifications with the combination of these probability values being output as a vector output in the input image based classification output 106, e.g., a vector of {0.92, 0.67, 0.12, 0.07} using the example classifications above indicates that there is a 92% probability that the input image is a cat, a 67% probability that it is a dog, a 12% probability that it is a horse, and a 7% probability it is a cow. From this vector output, a final classification may be determined based on the highest probability, e.g., in this example the final classification would be "cat" given the above probability values. Alternatively, rather than the input image based classification 106 comprising a vector output, the input image based classification 106 may be the final classification along with the corresponding probability value for that classification, also sometimes referred to as the confidence score for the classification. Thus, the term "classification" or "class" in the context of the output generated by the machine learning model may refer to either a vector output with probability values or scores associated with different predefined categories (or classifications), or a one-hot or binary output indicating a classification of the input. For purposes of the present description of an example embodiment, the classification or class will be considered to be a vector output comprising probability values or scores indicating the likelihood that a corresponding class is a correct classification for the input to the machine learning model.

In a parallel operation, occurring at substantially a same time, the ICSR engine 110 searches an image repository 114 for images that are similar to the image present in the input data 102. The image repository 114 may store images that are unrelated to the input image in the input data 102, other than for the visual similarities determined by the ICSR engine 110, e.g., they may be from different source computing systems, may be associated with different compilations of images, or the like. The search is based on visual characteristics of the input image, e.g., pixel values, regions, contours, or any other visual aspect of the input image that may be used as a basis for searching for similar images in the image space as opposed to the feature space used by the classifiers 104 and 120 to evaluate features of input images. Various currently known or later developed similar image search and retrieval algorithms may be utilized to accomplish the search and retrieval of similar images to the input image 102 from the image repository 114. For example, the ICSR engine 110 may utilize specifically trained internal image search/retrieval algorithms or a separate external system, such as Google™ image search, Amazon™ Web Services (AWS) visual recognition application programming interface (API), or the like. One principle requirement, however, is that the algorithms implemented by or accessed by the ICSR engine 110 to perform the search and retrieval of similar images to the input image 102 consistently provide the same list of visually similar images for the same input, e.g., if there are 10 images in the similar images set, as lone as the same 10 images are returned, the output of the cohort classifier will not change substantially.

The ICSR engine 110 may find one or more similar images in the image repository 114 for inclusion in the similar image cohort 112. The similar images may be found by the ICSR engine 110 using the same similar image search/retrieval algorithm or a plurality of different image search/retrieval algorithms. The similar image cohort 112 is input to the cohort based ML classifier 120 which performs image classification operations, similar to that of the target ML classifier 104, on the one or more similar images in the similar image cohort 112.

In some cases, the cohort based ML classifier 120 may comprise multiple instances of the cohort based ML classifier 120 which each operate on a different one of the one or more similar image cohorts 112 and the resulting outputs generated may be combined to generate a single cohort based classification output 122. For example, the probability values generated for each instance may be combined to generate a resulting aggregate probability value, may be averaged, or otherwise combined to generate a probability value for the corresponding classification, e.g., if one instance has a probability of 0.93 and another has a probability value of 0.89, an average probability value for the various instances for this class may be 0.91. In some cases, a highest probability value or lowest probability value for each class may be selected to be part of the final cohort based classification 122. Any fusion of scores from the multiple cohort based ML classifiers 120 may be utilized without departing from the spirit and scope of the present invention. Moreover, in some illustrative embodiments, a signature of the class probability outputs from the cohort based ML classifiers may be generated and a classifier layer, e.g., SVM/logistic regression/boosting/a shallow neural network, or the like, may be used to convert a vector of class probabilities obtained using the cohort images to a single output.

The resulting cohort based classification 122 is output to the adversarial input detection (AID) engine 124 which also receives the input image based classification 106 output by the target ML classifier 104. The AID engine 124 compares the classification outputs 106 and 124 and generates an adversarial decision output 126 indicating whether or not the AID engine 124 has detected that the input data 102 likely contains an adversarial input image that is part of an attack on the target ML classifier 104. In one illustrative embodiment, the AID engine 124 determines, for a highest probability value classification in the cohort based classification output 122, a difference between this highest probability value and a probability value for the same corresponding classification present in the input image based classification output 106. This difference is then compared to a threshold or tolerance parameter to determine if this difference is equal to or greater than the threshold or tolerance parameter. If the difference is equal to or greater, then the input data 102 is determined to include an adversarial input image. If the difference is not equal to or greater than this threshold or tolerance parameter, then the input data 102 does not include an adversarial input image.

The threshold or tolerance parameter is a parameter that is set to indicate that a difference is significantly higher than the expected deviation as observed at the end of the training of the target ML classifier 104 and the cohort based ML classifier 120. That is, through training of the classifiers 104 and 120, these classifiers have their operational parameters modified so as to minimize a loss function. This training is performed iteratively until the loss (or error) is equal to or below a training threshold. The threshold or tolerance parameter used by the AID engine 124 is set equal to or higher than this training threshold so as to indicate when the discrepancies between the outputs 106 and 122 indicate an adversarial input 102 as opposed to just acceptable differences between the operations of the classifiers 104 and 120. This threshold or tolerance parameter used by the AID engine 124 may be tuned as per the cost associated with a false detection versus a missed detection of an adversarial input image as per the requirements of the target ML classifier 104.

The adversarial decision output 126 may be provided to a mitigation system 128 which may be a computing system that performs one or more operations for mitigating the effects of any adversarial input images being input to the target ML classifier 104. The one or more operations performed by the mitigation system 128 may take many different forms depending on the desired implementation as noted previously above. For example, the mitigation system 128 may send a notification message 140 to an administrator computing device so as to inform a human administrator of the adversarial input in the input data 102. This mitigation operation may further involve logging the adversarial input and features of the adversarial input, e.g., source of the adversarial input image, misclassification generated by the target ML classifier, and other characteristics, in an attack log data structure 130 which may be analyzed at a later time so as to inform a system administrator, designer of the target ML classifier 104, or other authorized personnel, of the adversarial input image so that they may act upon it based on their policies.

In some illustrative embodiments, in response to detecting that the input image in the input data 102 is likely adversarial based on a difference in the outputs 106, 122 of the target ML classifier 104 and the cohort based ML classifier 120, the mitigation system 128 may reject the input image in the input data 102, discard the results of any target ML classifier 104 processing of the input image, i.e. input image based classification 106, and send a request to a source of the input image 102 to provide a different input image 102 while also logging the adversarial input for reference in the attack log 130. The rejection of the input image and/or discarding of the results of the target ML classifier 104 may be performed prior to the results of the target ML classifier 104 being provided to a downstream computing system that uses the classification results to perform a computer based cognitive operation, e.g., an image recognition framework that performs image recognition operations based on the classification results generated by the target ML classifier 104. Alternatively, the rejection and/or discarding may be performed after the results have been provided to the downstream computing system, such that a notification may be sent to the downstream computing system to cause it to discard its own results generated based on operations performed using the results of the target ML classifier 104 as a basis.

The mitigation system 128 may evaluate the attack log 130 entries to determine if a large number (equal to or above a predetermined threshold) of adversarial input images are received from a same source computing system. If a same source computing system is the source of a large number of adversarial inputs, then mitigation actions may include blocking any further inputs from that source computing system and notifying a system administrator of the source of the adversarial inputs, notifying a government or oversight organization of the adversarial inputs and the attack, or the like, via notifications 140. In performing such notification, automatic computer based communications may be initiated that includes data structures representing the logged information, from the attack log 130, regarding adversarial inputs, the source(s) of the adversarial inputs, and the overall attack. The notified parties may then take appropriate actions to address the source of the multiple attacks.

In still other illustrative embodiments, the mitigation operation performed by the mitigation system 128 may involve automatically performing operations to attempt to automatically correct or mitigate the adversarial attack, such as the purification operation described in commonly assigned and co-pending U.S. patent application Ser. No. 16/452,709, entitled "Detecting and Purifying Adversarial Inputs in Deep Learning Computing Systems," filed Jun. 26, 2019, mentioned previously. Of course, other automatic mitigation operations may also be implemented based on the detection of an adversarial input using the mechanisms of the illustrative embodiments.

Assuming that the input data 102 is determined to not contain an adversarial input image, and thus the operation of the target ML classifier 104 is not compromised by the input data 102 and the output generated 106 may be relied upon by downstream computing systems, no mitigation is performed by the mitigation system 128. In such a case, the downstream computing systems may perform their operations in a normal fashion and no logging of any attacks or notifications are necessary. Thus, only when there is a significant discrepancy between the first output generated by the target ML classifier 104 based on the input data 102, and the second output generated by the cohort based ML classifier 120 based on one or more similar images to the input image in the input data 102, will a mitigation operation be initiated since it is only under these circumstances that an adversarial input is detected.

Figure 2:
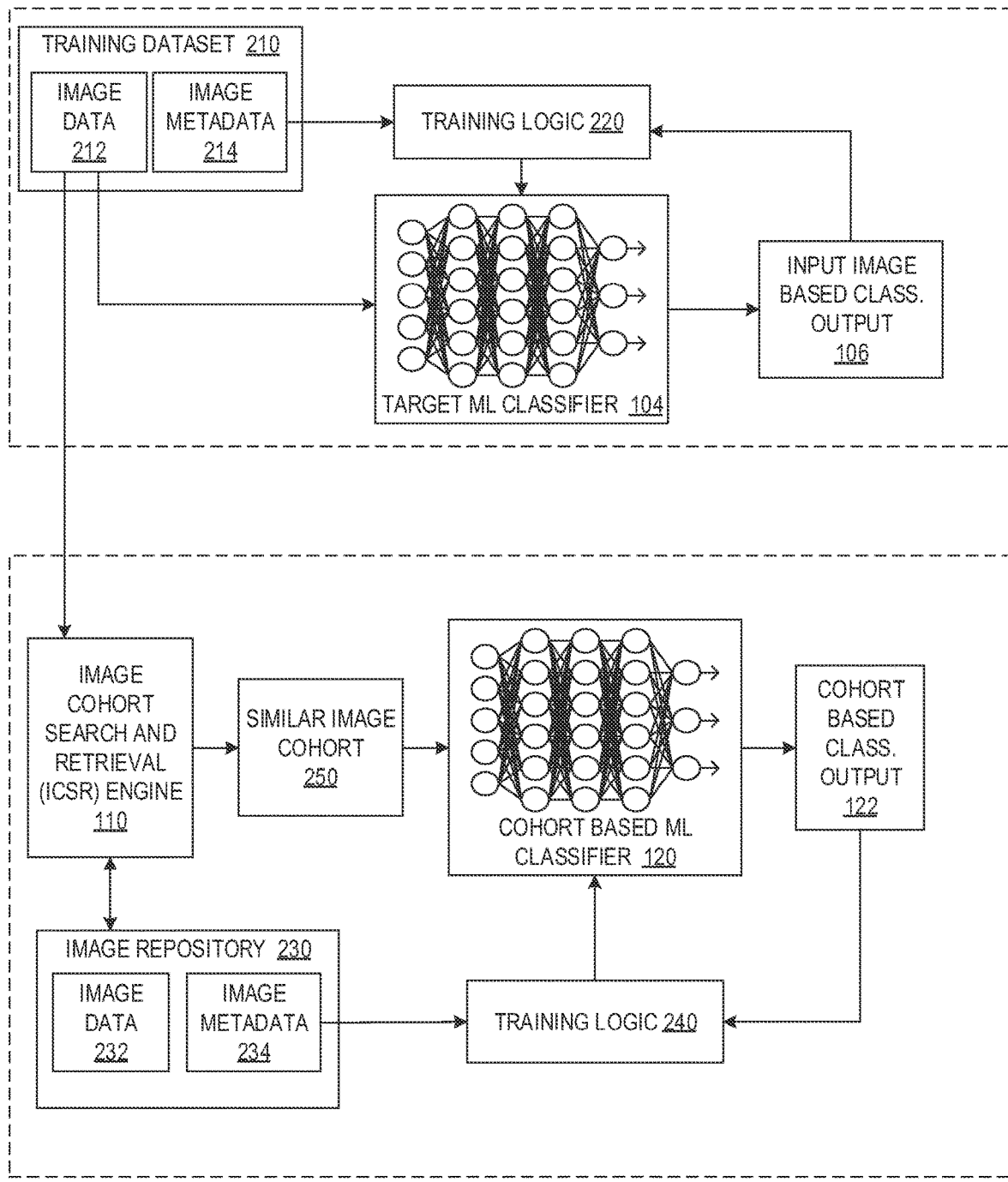
FIG. 2 is an example block diagram illustrating the independent training of the target ML classifier and the cohort based ML classifier in accordance with one illustrative embodiment.

FIG. 2 is an example block diagram illustrating the independent training of the target ML classifier 104 and the cohort based ML classifier 120 in accordance with one illustrative embodiment. The separate training operations are denoted by the dashed boxes with the only connection between the training operations being the ICSR engine 110 using the image data 212 of the training dataset 210 to search for and retrieve similar images from an image repository 230. Other than this one connection, the actual training of the classifiers 104 and 120 are independent of each other.

As shown in FIG. 2, in order to train the target ML classifier 104, a training dataset 210 is provided that comprises training image data 212 and image metadata 214. The image metadata 214 comprises metadata indicating a correct classification for the corresponding image data 212. Thus, for each image in the training dataset 210, there is a set of image data 212 and a corresponding image metadata 214. The image metadata 214 can be considered a machine learning ground truth data structure in that the image metadata 214 provides the actual true classification for the corresponding image, against which the output of the target ML classifier 104 may be compared in order to perform the machine learning training operation.

The target ML classifier 104, or target computer model, is trained through a machine learning training operation implemented by the training logic 220 whereby, through either supervised or unsupervised machine learning, the operational parameters are adjusted based on a detected error in the output of the computer model until the error (or loss) is minimized to a predetermined level, e.g., equal to or less than a predetermined threshold level of error/loss. For example, in an embodiment in which the target ML classifier 104 is a CNN, operational parameters of the nodes of the CNN may be modified through an iterative machine learning training operation by training logic that modifies the weights associated with node connections, hyperparameters, or the like so as to minimize the error/loss in the output generated by the CNN.

The computer model 104 may be trained to perform various types of cognitive operations, such as decision support operations, recommendation generation, classification, etc. For purposes of the present description, it is again assumed that the computer model 104 is a CNN that is trained to perform an image classification operation on input data that represents one or more images, and thus the computer model is identified as a target ML classifier 104. The same is true for the cohort based ML classifier 120. It should be appreciated that this is only one example of an application of the computer models 104 and 120 with which the mechanisms of the illustrative embodiments may be implemented. The computer models 104, 120 are not limited to such and other applications, such as treatment recommendations in a medical domain, buy/sell recommendations in a financial domain, medical diagnosis support operations, vehicle control operations, computer security operations based on patterns of activity being recognized, and the like, may be the focus of the computer model 104, 120 operations. Furthermore, in some illustrative embodiments, such cognitive operations may be performed by downstream computing systems based on the image classification output generated by the computer model 104 operating as a target ML classifier 104, e.g., the image classification output by the target ML classifier 104 may be provided to a downstream cognitive computing system that uses the image classification to perform other operations for performing medical diagnosis support, vehicle control operations, computer security operations, or the like.

Moreover, the input data 102 or 210 is not limited to image data and may be any type of input data for the particular implementation of the computer models 104, 120, e.g., financial data, patient information, computer security event information, etc. For example, rather than detecting the presence of adversarial images, the mechanisms of the illustrative embodiments may perform similar operations but with collections of financial data, patient information, computer security event information, or any other suitable data such that adversarial inputs in such data may be detected when otherwise such data may not be perceptible.

Assuming an image classification operation of the computer models 104, 120, and the computer models 104, 120 being a CNN, the target ML classifier 104 is trained to output a vector output in which vector slots of the vector output comprise possible classifications of input image data. As discussed above, the values present in the vector slots represent the confidence or probability that the input data is properly classified in the corresponding classification. Thus, for example, if the vector output has a first vector slot corresponding to the classification "desk", and a second vector slot corresponding to the classification "cat", a value of 0.6065 in the first vector slot indicates that the target ML classifier 104 has determined that there is a 60.65% probability that the input image that is input to the target ML classifier 104 is an image of a desk (or stating this differently, there is a 60.65% confidence that the image is of a desk). Similarly, if there is a value of 0.0575 in the second vector slot, this indicates that the target ML classifier 104 has determined that there is a 5.75% probability that the input image is that of a cat. Thus, the target ML classifier 104 generates probability (or confidence) values for each of the potential classifications of the input image data 212 indicating the target ML classifier's prediction of which classification is appropriate for the input image data 212. These probabilities, during a training operation, may be compared to a ground truth classification for input images 212, such as is provided in the image metadata 214, to determine the error or loss in the output of the target ML classifier 104. Based on the determined loss/error, the training logic 220 is employed to evaluate this error/loss and adjust operational parameters of the target ML classifier 104 to minimize this error/loss to a predetermined acceptable level, e.g., a threshold level of error/loss or less.

The cohort based ML classifier 120 is likewise trained using training logic 240 in a separate and independent training operation. The difference between the training performed on the cohort based ML classifier 120 from that of the target ML classifier 104 is that the training is performed, not using the image data 212 and image metadata 214 of the training dataset 210, but rather similar images obtained by searching an image repository 230. That is, the image data 212 from the training dataset 210 is provide to the ICSR engine 110 which searches for visually similar images in the image repository 230 based on visual characteristics of the image data 212, e.g., pixel values, contours, regions, etc. Again, as with the runtime operation described previously, the ICSR engine 110 may utilize any known or later developed algorithms for determining similar images using similarity metrics, distance metrics, and/or the like. The image data 232 and corresponding image metadata 234 from the image repository 230 for the similar images is retrieved by the ICSR engine 110 to generate a similar image cohort 250. The similar image cohort 250 is a training dataset for the cohort based ML classifier 120 that is generated based on similarities of other images in the repository 230 to the training images in the training dataset 210.

The similar image cohort 250 is input to the cohort based ML classifier 120 which generates a cohort based classification 122 that is output to the training logic 240 which generates a loss/error based on the image metadata 234 for the similar images input as part of the cohort 250. As with the target ML classifier 104, the training logic 240 modifies operational parameters of the cohort based ML classifier 120 so as to minimize this loss/error equal to or below a predetermined threshold.

Thus, the target ML classifier 104 is independent trained to properly classify the training dataset 210 and the cohort based ML classifier 120 is independently trained to properly classify the visually similar images retrieved from an image repository 230. Hence, during runtime operation, if the target ML classifier 104 generates a classification output 106 that is significantly different from the classification output 122 generated by the cohort based ML classifier 120, then the cause of this discrepancy in output must be due to a significant difference in the feature space since the images operated on by the two classifiers are visually similar, i.e. there is an insignificant difference in the image space. Significant differences in the feature space that cause a significant difference in the output classification are indicative of a likely adversarial input which may be part of an attack on the target ML classifier 104.

Figure 3:
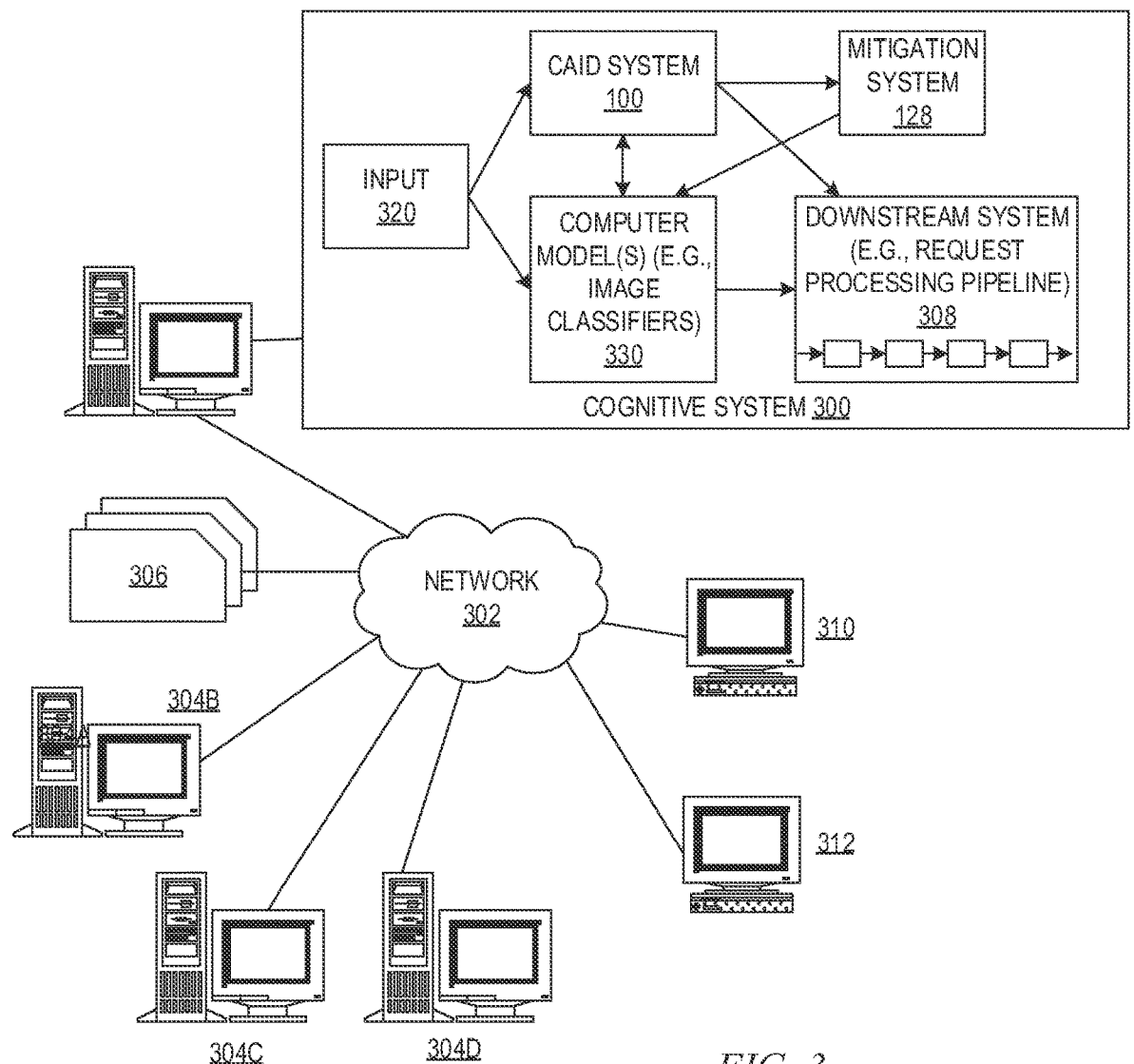
FIG. 3 depicts a schematic diagram of one illustrative embodiment of a distributed data processing system in which aspects of the present invention may be implemented.
Figure 4:
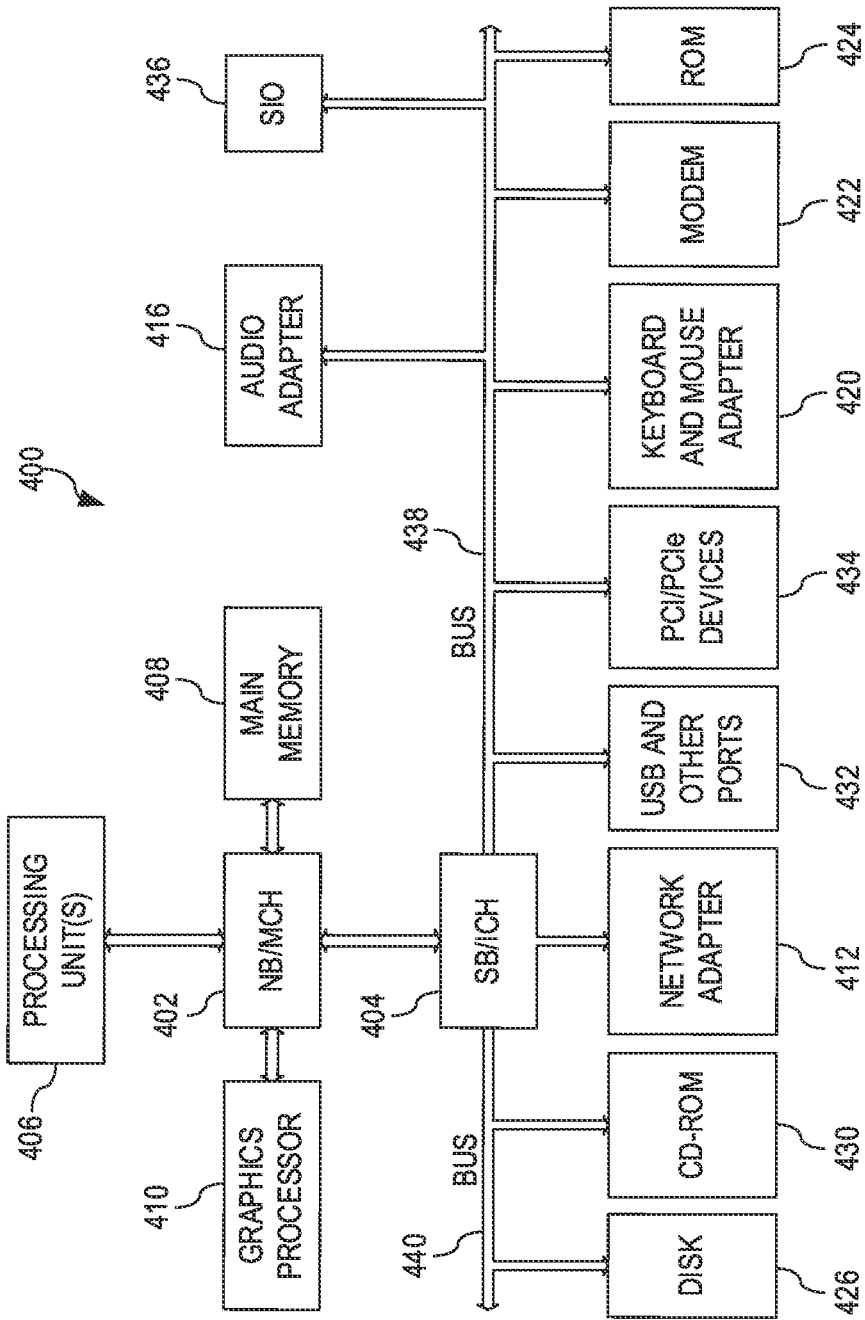
FIG. 4 is a block diagram of an example data processing system in which aspects of the illustrative embodiments are implemented.

As discussed previously, the mechanisms of the illustrative embodiments are directed to an improved computer tool that implements a cohort-based adversarial input detection (CAID) system that operates to detect whether input data comprises an adversarial input and if so initiate mitigation operations for minimizing the effects of such adversarial inputs on computer operations, such as cognitive computer operations. As such, the illustrative embodiments may be utilized in many different types of data processing environments. In order to provide a context for the description of the specific elements and functionality of the illustrative embodiments, FIGS. 3-4 are provided hereafter as example environments in which aspects of the illustrative embodiments may be implemented. It should be appreciated that FIGS. 3-4 are only examples and are not intended to assert or imply any limitation with regard to the environments in which aspects or embodiments of the present invention may be implemented. Many modifications to the depicted environments may be made without departing from the spirit and scope of the present invention.

The mechanisms of the illustrative embodiments may be implemented in and by a computing system specifically configured with the operational elements previously described above with regard to FIG. 1 to thereby render the computing system a specific or special purpose computing system. The computing system may operate solely to evaluate input data being used with a computer model, detect adversarial inputs, and initiate mitigation operations for mitigating the effects of adversarial inputs. In other illustrative embodiments, the mechanisms of the illustrative embodiments may operate in conjunction with or as part of a cognitive computing system that utilizes the computer model(s), e.g., the target ML classifier, to perform classification operations or other cognitive operations upon which other operations of the cognitive computing system may operate. That is, a cognitive computing system may implement a downstream system, e.g., a request processing pipeline, in which one or more computer model(s), such as the target ML classifier, are employed to perform cognitive evaluations of input data, such as classifying the input data into one or more predetermined classes, which may influence other operations performed by the downstream system, e.g., based on an image classification, additional operations are performed to control performance of actions, control access to resources, or the like.

With regard to a cognitive computing system architecture embodiment, as mentioned above, the cognitive computing system implements a downstream system, which in the depicted examples is assumed to be a request processing pipeline employing a request processing methodology, and which may be implemented using a request processing computer program product executing on one or more computing devices, with which the mechanisms of the illustrative embodiments operate. The requests may be provided as structured or unstructured request messages, natural language questions, or any other suitable format for requesting an operation to be performed by the cognitive system. In some illustrative embodiments, the requests may be in the form of input data sets that are to be classified in accordance with a cognitive classification operation performed by a machine learning, neural network, deep learning, or other artificial intelligence based model that is implemented by the cognitive system. The input data sets may represent various types of input data depending upon the particular implementation, such as audio input data, image input data, textual input data, or the like. For example, in one possible implementation, the input data set may represent a medical image, such as an x-ray image, CT scan image, MRI image, or the like, that is to have portions of the image, or the image as a whole, classified into one or more predefined classifications. In other possible implementations, the input data set may represent facial images, images of text, biometric images, camera captured images of an environment, such as in a vehicle mounted camera system, natural language textual content, or any other type of input that may be represented as data and for which a classification operation is to be performed so as to perform a cognitive operation by a cognitive system.

It should be appreciated that classification of input data may result in a labeled set of data that has labels or annotations representing the corresponding classes into which the non-labeled input data set is classified. This may be an intermediate step in performing other cognitive operations by the cognitive system that support decision making by human users, e.g., the cognitive system may be a decision support system, or by other automated mechanisms, such as vehicle control and/or safety systems. For example, in a medical domain, the cognitive system may operate to perform medical image analysis to identify anomalies for identification to a clinician, patient diagnosis and/or treatment recommendation, drug interaction analysis, or any of a plethora of other possible decision support operations. In a security domain, the cognitive system may operate to control access to physical premises, data assets, computing assets, or any other type of asset to which access is to be restricted. In a vehicle control and/or safety system, the cognitive system may operate to control other systems of the vehicle to maintain the safety of the vehicle and its passengers, such as automatic braking, steering, and the like. In other domains, the cognitive system may perform different types of decision making operations or decision support operations based on the desired implementation.

It should be appreciated that the cognitive system, while shown as having a single downstream system (hereafter assumed to be a request processing pipeline) in the examples hereafter, may in fact have multiple downstream systems, or request processing pipelines. Each request processing pipeline may be separately trained and/or configured to process requests associated with different domains or be configured to perform the same or different analysis on input requests, depending on the desired implementation. For example, in some cases, a first request processing pipeline may be trained to operate on input requests directed to a medical image analysis, while a second request processing pipeline may be configured and trained to operate on input requests concerning patient electronic medical record (EMR) analysis involving natural language processing. In other cases, for example, the request processing pipelines may be configured to provide different types of cognitive functions or support different types of applications, such as one request processing pipeline being used for patient treatment recommendation generation, while another pipeline may be trained for financial industry based forecasting, etc.

Moreover, each request processing pipeline may have their own associated corpus or corpora that they ingest and operate on, e.g., one corpus for medical treatment documents and another corpus for financial industry domain related documents in the above examples. In some cases, the request processing pipelines may each operate on the same domain of input requests but may have different configurations, e.g., different annotators or differently trained annotators, such that different analysis and potential results are generated. The cognitive system may provide additional logic for routing input requests to the appropriate request processing pipeline, such as based on a determined domain of the input request, combining and evaluating final results generated by the processing performed by multiple request processing pipelines, and other control and interaction logic that facilitates the utilization of multiple request processing pipelines.

The illustrative embodiments may be integrated in, augment, and extend the functionality of these request processing pipelines by providing mechanisms to evaluate input data sent to the request processing pipeline, detect adversarial inputs in the input data, and initiate mitigation operations to mitigate the effects of adversarial inputs. In particular, in portions of the cognitive system in which the trained neural network models, machine learning models, deep learning models, or the like, are employed to generate labeled data set outputs, the mechanisms of the illustrative embodiments may be implemented to verify that the input to the model is not adversarial and if it is adversarial, take appropriate action to protect the downstream systems or request processing pipelines. In some cases, the detection of the adversarial inputs may cause mitigation operations to be employed that involve logging attacks, sending notifications, blocking input from sources, discarding results generated based on the adversarial input, and the like. In some cases, the mitigation operation may involve automatic purification of the input and generating results based on the purified input rather than the adversarial input, as discussed in the co-pending U.S. patent application mentioned previously.

As the mechanisms of the illustrative embodiments may be part of a cognitive system and may improve the operation of the cognitive system by protecting it from adversarial attacks, it is important to have an understanding of how cognitive systems implementing a request processing pipeline are implemented. It should be appreciated that the mechanisms described in FIGS. 3-4 are only examples and are not intended to state or imply any limitation with regard to the type of cognitive system mechanisms with which the illustrative embodiments are implemented. Many modifications to the example cognitive system shown in FIGS. 3-4 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, image recognition logic, and the like, which may be provided as specialized hardware, software executed on hardware, or any combination of specialized hardware and software executed on hardware. This logic may implement one or more computer models, such as a neural network model, a machine learning model, a deep learning model, that may be trained for particular purposes for supporting the particular cognitive operations performed by the cognitive system. In accordance with the mechanisms of the illustrative embodiments, the logic further implements an CAID system 100 for detecting adversarial inputs and initiating mitigation operations. In this way, the CAID system 100 fortifies the cognitive computing system from adversarial attacks.

The logic of the cognitive system implements the cognitive computing operation(s), examples of which include, but are not limited to, question answering, identification of related concepts within different portions of content in a corpus, security operations for controlling access to premises or assets, intelligent search algorithms, such as Internet web page searches, for example, medical diagnostic and treatment recommendations, other types of recommendation generation, e.g., items of interest to a particular user, potential new contact recommendations, etc., image analysis, audio analysis, vehicle system controls, and the like. The types and number of cognitive operations that may be implemented using the cognitive system of the illustrative embodiments are vast and cannot all be documented herein. Any cognitive computing operation emulating decision making and analysis performed by human beings, but in an artificial intelligence or cognitive computing manner, is intended to be within the spirit and scope of the present invention.

IBM Watson™ is an example of one such cognitive computing system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive computing systems (or simply "cognitive systems") provide mechanisms for processing input data to perform a cognitive operation, such as answering questions posed to these cognitive systems and/or process requests which may or may not be posed as natural language questions. The request processing pipeline and/or cognitive computing system comprises one or more artificial intelligence applications executing on data processing hardware that process requests, which may be formulated in structured or unstructured manner, as input data with implied requests for performance of the cognitive operations, or the like. The request processing pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the request processing pipeline. The document may include any file, text, article, or source of data for use in the cognitive computing system. For example, a request processing pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain. In some illustrative embodiments, the corpus or corpora may comprise image data for processing by the cognitive computing system, and in accordance with the mechanisms described above, may include a training dataset and adversarial attack input data for evaluation.

Content users, which may be human beings or automated computing systems, input requests to the cognitive system which implements the request processing pipeline. The request processing pipeline then processes the requests using the content in the corpus of data by evaluating documents, sections of documents, portions of data in the corpus, images, or the like. When a process evaluates a given section of a document for semantic content, the process can use a variety of conventions to query such document from the request processing pipeline, e.g., sending the query to the request processing pipeline as a well-formed question which is then interpreted by the request processing pipeline and a response is provided. Semantic content is content based on the relation between signifiers, such as words, phrases, signs, and symbols, and what they stand for, their denotation, or connotation. In other words, semantic content is content that interprets an expression, such as by using Natural Language Processing.

The request processing pipeline receives an input, parses the input to extract the major features of the input, uses the extracted features to formulate queries, and then applies those queries to the corpus of data. Based on the application of the queries to the corpus of data, the request processing pipeline generates a set of hypotheses, or candidate results, by looking across the corpus of data for portions of the corpus of data that have some potential for containing a valuable response to the input and expressed or implied request. The request processing pipeline then performs deep analysis on the content of the input and each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, image analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity. Still others may perform image processing and classification operations on input images in the input request to thereby classify the image into one of a plurality of predefined image classifications using a computer model, such as a DNN, CNN, or other machine learning or deep learning computer model. In the case of the example embodiments previously described above, the target ML classifier 104 in FIG. 1 may be one of the reasoning algorithms used by the downstream system, or request processing pipeline, 308 in FIG. 3 to perform these cognitive operations based on the classification output generated by the target ML classifier 104.

The scores obtained from the various reasoning algorithms indicate the extent to which the potential response is inferred by the input based on the specific area of focus of that reasoning algorithm. Each resulting score is then weighted against a statistical model. The statistical model captures how well the reasoning algorithm performed at establishing the inference between two similar portions of content for a particular domain during the training period of the request processing pipeline. The statistical model is used to summarize a level of confidence that the request processing pipeline has regarding the evidence that the potential response is inferred by the input. This process is repeated for each of the candidate results until the request processing pipeline identifies candidate results that surface as being significantly stronger than others and thus, generates a final result, or ranked set of results, for the input request, which in some implementations may be a control signal sent to other computer systems, actuators, or other electronics to control the operation of another system, e.g., in a vehicle control and safety system, the result may be a control signal sent to an automatic braking system, automatic steering system, obstacle avoidance system, dashboard warning systems, or the like. In a computerized security system, facial recognition performed by the downstream system based on image classification operations of a target ML classifier 104 may be used as a basis for controlling access to physical and/or virtual resources, such as physical premises, computing devices, storage devices, or computer data structures.

FIG. 3 depicts a schematic diagram of one illustrative embodiment of a distributed data processing system in which a cognitive computing system 300 implementing a downstream system 308, which in the depicted example is a request processing pipeline 308, is provided in a computer network 302. The downstream system 308 is referred to as a "downstream" system in the present context because it is downstream of the computer models 330 which provide the image classification upon which the downstream system 308 bases at least part of its operations. While the cognitive computing system 300 may be configured for a variety of different purposes depending on the desired implementation, e.g., image analysis, facial recognition, vehicle control, question answering, cognitive content searches, and the like, it will be assumed for purposes of the present description that one or more of the computer models 330 which operate within the cognitive computing system 300 are configured to perform image classification operations that support one or more other image analysis operations of the cognitive system 300. These other image analysis operations of the cognitive system 300 may include, but are not limited to, facial recognition, biometric based access control, e.g., fingerprint or retina scan access control, camera based object identification and corresponding controls, such as vehicle controls, or the like. In the case of a vehicle control mechanism, the cognitive computing system may be implemented in an on-board computing system of the vehicle and thus, may operate wirelessly from the other depicted computing systems in FIG. 3.

The cognitive system 300 is implemented on one or more computing devices 304A-D (comprising one or more processors and one or more memories, and potentially any other computing device elements generally known in the art including buses, storage devices, communication interfaces, and the like) connected to the computer network 302. For purposes of illustration only, FIG. 3 depicts the cognitive system 300 being implemented on computing device 304A only, but as noted above the cognitive system 300 may be distributed across multiple computing devices, such as a plurality of computing devices 304A-D. The network 302 includes multiple computing devices 304A-D, which may operate as server computing devices, and 310-312 which may operate as client computing devices, in communication with each other and with other devices or components via one or more wired and/or wireless data communication links, where each communication link comprises one or more of wires, routers, switches, transmitters, receivers, or the like. Other embodiments of the cognitive system 300 may be used with components, systems, sub-systems, and/or devices other than those that are depicted herein.

The cognitive computing system 300 is configured to implement a request processing pipeline 308 that receive inputs from various sources. The requests may be posed in the form of a structured or unstructured (e.g., natural language) requests for the performance of a cognitive operation, or the like. Alternatively, the "request" may simply be the input of data that is intended to be operated on by the cognitive computing system 300, e.g., images, text, audio input, or the like, which is to be classified by the computer model(s) 330 of the illustrative embodiments and then operated on by cognitive processes of the downstream system, e.g., logic of the request processing pipeline, to generate a result of a cognitive operation. For example, the cognitive system 300 receives input from the network 302, a corpus or corpora of electronic documents 306, cognitive system users, image capture devices, audio capture devices, biometric scanners, textual message interception devices, and/or other data sources and other possible sources of input.

In one embodiment, some or all of the inputs to the cognitive system 300 are routed through the network 302. The various computing devices 304A-D on the network 302 include access points for content creators and cognitive system users, both of which may be human creators/users or other computing systems operating automatically, semi-automatically, or with manual intervention by a user. Some of the computing devices 304A-D include devices for a database storing the corpus or corpora of data 306 (which is shown as a separate entity in FIG. 3 for illustrative purposes only). Portions of the corpus or corpora of data 306 may also be provided on one or more other network attached storage devices, in one or more databases, or other computing devices not explicitly shown in FIG. 3. The network 302 includes local network connections and remote connections in various embodiments, such that the cognitive system 300 may operate in environments of any size, including local and global, e.g., the Internet.

Depending on the particular domain and implementation of the cognitive system 300, the corpus or corpora of data 306 may take many different forms. In a natural language implementation, the corpus or corpora 306 may be composed of natural language unstructured documents, structured documents, or the like. In a domain in which image analysis is being performed, the corpus or corpora 306 may include image data for various types of entities. In an audio analysis domain, the corpus or corpora 306 may contain audio patterns representing different entities or sources of audible sounds. In an image analysis domain, the corpus or corpora 306 may contain various images in digital form representing different recognizable entities or objects. The content of the corpus or corpora 306 may vary depending on the type of data needed to perform cognitive operations.

In one embodiment, the content creator creates content in a document of the corpus or corpora of data 306 for use as part of a corpus of data with the cognitive system 300. The document includes any file, text, article, or source of data for use in the cognitive system 300. Cognitive system users access the cognitive system 300 via a network connection or an Internet connection to the network 302, and input requests to the cognitive system 300 that are processed based on the content in the corpus or corpora of data 306. The cognitive system 300 parses and interprets the request via the request processing pipeline 308, and provides a response to the cognitive system user, e.g., cognitive system user 310, containing one or more results of processing the request. In some embodiments, the cognitive system 300 provides a response to users in a ranked list of candidate responses while in other illustrative embodiments, the cognitive system 300 provides a single final response or a combination of a final response and ranked listing of other candidate responses.

The cognitive system 300 implements the pipeline 308 which comprises a plurality of stages for processing an input request based on information obtained from the corpus or corpora of data 306. The pipeline 308 generates responses for the input request based on the processing of the input request and the corpus or corpora of data 306.

In some illustrative embodiments, the cognitive system 300 may be the IBM Watson™ cognitive system available from International Business Machines Corporation of Armonk, N.Y., which is augmented with the mechanisms of one or more of the illustrative embodiments described herein. More information about the request processing pipeline of the IBM Watson™ cognitive system may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As noted above, the input to the cognitive system 300 from a client device may be formatted or structured as any suitable type of request, or simply as a set of input data to be processed, which may be parsed and analyzed using structured and/or unstructured input analysis, including but not limited to natural language parsing and analysis mechanisms of a cognitive system such as IBM Watson™, to determine the basis upon which to perform cognitive analysis and providing a result of the cognitive analysis. Such processing may alternatively, or in addition, include image analysis, audio analysis, textual image analysis, biometrics analysis, or any other type of cognitive analysis that utilizes neural network, machine learning, or other cognitive models which may be trained and hardened against adversarial attacks in accordance with the illustrative embodiments.

The processing of the request involves the application of a trained model, e.g., neural network model, machine learning model, deep learning (cognitive) model, etc., to an input data set as described previously above. This input data set may represent features of the actual request itself, data submitted along with the request upon which processing is to be performed, or the like. The application of the trained model to an input data set may occur at various points during the performance of the cognitive computing operations by the cognitive system. For example, the trained model may be utilized during feature extraction and classification by a feature extraction stage of processing of the request, e.g., taking a natural language term in the request and classifying it as one of a plurality of possible concepts that the term corresponds to, e.g., classifying the term "truck" in an input request into a plurality of possible classes, one of which may be "vehicle". As another example, a portion of an image comprising a plurality of pixel data may have the trained model applied to it to determine what the object is that is in the portion of the image or classify the image as a whole. The mechanisms of the illustrative embodiments operate on the input data to determine whether the input data comprises adversarial input, and if so, initiates a mitigation operation to minimize the effects of the adversarial input data on the runtime operation of the cognitive system 300.

As shown in FIG. 3, the cognitive system 300 is further augmented, in accordance with the mechanisms of the illustrative embodiments, to include the CAID system 100 and mitigation system 128, such as described previously with regard to FIG. 1, and which operates on input data 320 provided for processing by one or more computer models 330 implemented in, or associated with, the request processing pipeline 308. The computer model(s) 330 may comprise the target ML classifier 104 of FIG. 1, for example, and the CAID system 100 may comprise the cohort based ML classifier and other elements shown in FIG. 1 which are used to determine whether the input 320 includes an adversarial input as part of an attack on the cognitive system 300. Although FIG. 3 shows the mitigation system 128 as being part of the cognitive system 300, it should be appreciated that the mitigation system 128 may be a separate entity from the cognitive system 300 and may be executed on the same or a different computing system from that of the cognitive system 300.

The CAID system 100 may be provided as an external engine that is external to the logic implementing the request processing pipeline 308 and/or computer model(s) 330. The CAID system 100 operates to detect adversarial inputs in the input data and initiate mitigation operations by the mitigation system 128, which may include purifying adversarial inputs such that the classification output generated by the computer model 330, e.g., target ML classifier, is not rendered incorrect due to the presence of adversarial perturbations. In one illustrative embodiment, this is accomplished, as described above, by processing the input data via the computer model 330 (target ML classifier 104), processing the input data via the cohort based ML classifier of the CAID system 100, comparing the outputs of these classifiers to determine if there is a discrepancy indicating an adversarial input, and then based on a determination that there is an adversarial input, initiating a mitigation operation by the mitigation system 128. Thus, correct classification and labeling of the input data set is performed while protecting or hardening the computer model(s) (e.g., neural network) 330 against adversarial attacks, such as evasion attacks. The resulting classified or labeled data set may be provided to further stages of processing downstream in the request processing pipeline 308 for further processing and performance of the overall cognitive operation for which the cognitive system 300 is employed.

It should be appreciated that while FIG. 3 illustrates the implementation of CAID system 100 and the computer model(s) 330 as part of a cognitive system 300, the illustrative embodiments are not limited to such. Rather, in some illustrative embodiments, the CAID system 100 and computer model(s) 330 may themselves be provided as a service from which a user of a client computing device 310, may request processing of an input data set. Moreover, other providers of services, which may include other cognitive systems, may utilize the CAID system 100 and computer model(s) 330 to augment the operation of their own cognitive systems. Thus, in some illustrative embodiments the CAID system 100 and computer model(s) 330 may be implemented in one or more server computing devices, accessed via one or more APIs via other computing devices through which input data sets are submitted to the CAID system 100 and computer model(s) 330, and corresponding notifications of adversarial input data and/or correctly labeled data sets are returned. Thus, the integration of the mechanisms of the illustrative embodiments into a cognitive system 300 is not required, but may be performed depending on the desired implementation.

Moreover, it should be noted that while FIG. 3 shows only a single CAID system 100 and corresponding computer model, e.g., image classifier, 330 being part of the cognitive system 300, the cognitive system 300 may employ multiple pairs of CAID system 100 and computer models 330. That is, for each computer model, or image classifier, 330 a corresponding CAID system instance 100 may be provided to verify that the input to the corresponding computer model 330 is not adversarial and initiate a mitigation operation in the case that it is adversarial. Again, many modifications to the depiction in FIG. 3 may be made without departing from the spirit and scope of the present invention.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 4 is provided as an example of one type of data processing system in which aspects of the present invention may be implemented. Many other types of data processing systems may be likewise configured to specifically implement the mechanisms of the illustrative embodiments.

FIG. 4 is a block diagram of an example data processing system in which aspects of the illustrative embodiments are implemented. Data processing system 400 is an example of a computer, such as a server computing device 304A-D or client computing device 310 in FIG. 3, in which computer usable code or instructions implementing the processes for illustrative embodiments of the present invention are located. In one illustrative embodiment, FIG. 4 represents a server computing device, such as a server 304A, which implements a cognitive system 300 and request processing pipeline 308 augmented to include the additional mechanisms of the illustrative embodiments described herein with regard to FIG. 3 for evaluating the sensitivity of a computer model to adversarial attack perturbations, generating a visualization of such sensitivities, generating an expanded training dataset, and/or training the computer model to harden it against such adversarial attacks.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 is connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash basic input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 is connected to SB/ICH 404.

An operating system runs on processing unit 406. The operating system coordinates and provides control of various components within the data processing system 400 in FIG. 4. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 400.

As a server, data processing system 400 may be, for example, an IBM® eServer™ System p® computer system, running the Advanced Interactive Executive (AIX®) operating system or the LINUX® operating system. Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and are loaded into main memory 408 for execution by processing unit 406. The processes for illustrative embodiments of the present invention are performed by processing unit 406 using computer usable program code, which is located in a memory such as, for example, main memory 408, ROM 424, or in one or more peripheral devices 426 and 430, for example.

A bus system, such as bus 438 or bus 440 as shown in FIG. 4, is comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, includes one or more devices used to transmit and receive data. A memory may be, for example, main memory 408, ROM 424, or a cache such as found in NB/MCH 402 in FIG. 4.

Those of ordinary skill in the art will appreciate that the hardware depicted in FIGS. 3 and 4 may vary depending on the implementation. Other internal hardware or peripheral devices, such as flash memory, equivalent non-volatile memory, or optical disk drives and the like, may be used in addition to or in place of the hardware depicted in FIGS. 3 and 4. Also, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device that is configured with flash memory to provide non-volatile memory for storing operating system files and/or user-generated data, for example. Essentially, data processing system 400 may be any known or later developed data processing system without architectural limitation.

Figure 5:
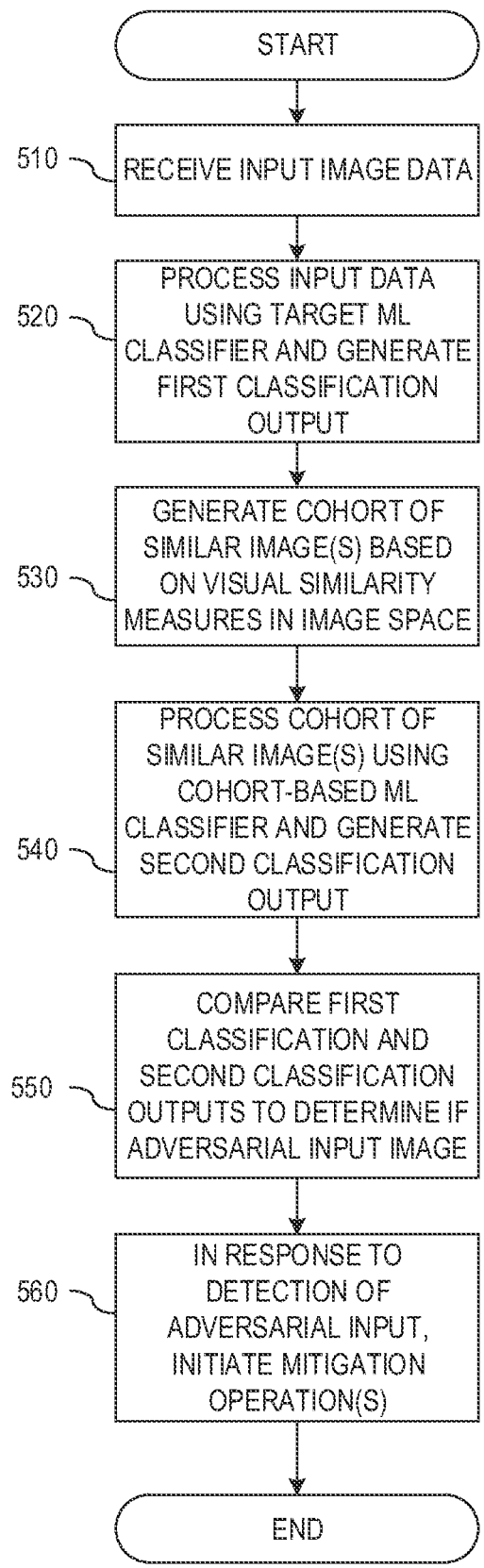
FIG. 5 is a flowchart outlining an example operation for detecting adversarial input data an initiating a mitigation operation in accordance with one illustrative embodiment.

FIG. 5 is a flowchart outlining an example operation for detecting adversarial input data an initiating a mitigation operation in accordance with one illustrative embodiment. For purposes of the operation outlined in FIG. 5, it is assumed that the target ML classifier and the cohort based ML classifier have already been trained through independent training operations as described above with regard to FIG. 2. The operation shown in FIG. 5 is for a runtime operation based on an input image received from a client computing device which requests that an image based cognitive operation be performed, such as image recognition or the like. As part of this image based cognitive operation, image classification is performed in the manner previously described above.

As shown in FIG. 5, the operation starts by receiving input data which may or may not comprise adversarial input (step 510). The input data is processed using the target ML classifier in order to generate a first classification output (e.g., vector of probability values, scores, one-hot, or binary classification) based on the original input data, i.e. the original input image (step 520). Based on the original input image, a cohort of one or more similar images is generated, where these similar images are visually similar to the input image using characteristics and similarity metrics in the image space (step 530). The cohort of similar image(s) are processed using a cohort-based ML classifier in order to generate a second classification output (e.g., vector of probability values, scores, one-hot, or binary classification) (step 540). The first and second classification outputs are compared to each other to determine if any discrepancies are present and if so, whether those discrepancies indicate that the input image is an adversarial input image (step 550). In response to an adversarial input having been detected based on the results of this comparison, one or more mitigation operations are initiated (step 560). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions which are executed by the at least one processor to specifically configure the at least one processor to implement at least one machine learning computer model, the method comprising:
    processing, by the at least one machine learning computer model, input data representing a first image to generate a first classification output;
    identifying, by the data processing system, at least one second image having similar characteristics to the first image based on a comparison of characteristics of the first image to characteristics of images in an image repository;
    processing, by the at least one machine learning computer model, the at least one second image to generate a second classification output;
    comparing, by the data processing system, the first classification output to the second classification output to determine whether or not the first image is an adversarial image; and
    initiating, by the data processing system, in response to a determination that the first image is an adversarial image, a mitigation operation.

2. The method of claim 1, wherein:
    the at least one machine learning computer model comprises a first machine learning computer model to process the input data representing the first image and a second machine learning computer model to process the at least one second image,
    the first machine learning computer model and second machine learning computer model are trained independently of each other, and
    the first machine learning computer model is trained on a training dataset comprising training images, and the second machine learning computer model is trained on cohorts of similar images that are visually similar to corresponding ones of the training images in the training dataset.

3. The method of claim 1, wherein identifying at least one second image comprises generating a cohort of one or more second images that are visually similar to the first image, and wherein generating the cohort comprises, for each image in the image repository, determining a measure of similarity between the image and the input image by calculating at least one of a similarity metric or distance metric.

4. The method of claim 1, wherein the at least one machine learning computer model comprises a deep learning neural network that is configured to perform an image classification operation in support of an image recognition operation performed by a cognitive computing system.

5. The method of claim 1, wherein the mitigation operation comprises at least one of sending a notification communication to an administrator computing device, wherein the notification message comprises data indicating features of the adversarial image, or logging the adversarial image and the features of the adversarial image in a log data structure.

6. The method of claim 1, wherein the mitigation operation comprises discarding results of the at least one machine learning computer model processing of the input data prior to the results being processed by a downstream computing system and sending a request to a source computing device from which the input data is received requesting that the source computing device provide different input data.

7. The method of claim 1, wherein the mitigation operation comprises logging the adversarial image and features of the adversarial image in a log entry of a log data structure, and evaluating one or more log entries in the log data structure to determine if a threshold number of adversarial input images are received from a same source computing device, and blocking further inputs from that source computing device in response to the threshold number of adversarial input images from the source computing device being reached or exceeded.

8. The method of claim 1, wherein the mitigation operation comprises automatically performing a purification operation to modify the first image represented by the input data to minimize perturbations in the input data corresponding to a discriminative region of the first image.

9. The method of claim 1, wherein the at least one machine learning computer model comprises a cohort-based machine learning computer model that processes the at least one second image to generate the second classification output, wherein the cohort based machine learning computer model is one of a plurality of cohort-based machine learning computer models, each cohort-based machine learning computer model in the plurality of cohort-based machine learning computer models processing a different one of the at least one second image, wherein generating the second classification operation comprises performing a fusion operation on outputs from the plurality of cohort-based machine learning computer models to generate a single second classification output.

10. The method of claim 1, wherein the at least one machine learning computer model is part of at least one stage of processing of a request processing pipeline of a cognitive computing system, and wherein the mitigation operation comprises discarding results of processing the input data by the at least one machine learning computer model prior to forwarding the results to downstream stages of processing of the request processing pipeline.

11. A computer program product comprising a computer readable storage medium having a computer readable program stored therein, wherein the computer readable program, when executed on a data processing system, causes the data processing system to implement a machine learning computer model, the data processing system operating to:
    process, by the machine learning computer model, input data representing a first image to generate a first classification output;
    identify at least one second image having similar characteristics to the first image based on a comparison of characteristics of the first image to characteristics of images in an image repository;
process, by the machine learning computer model, the at least one second image to generate a second classification output;
compare the first classification output to the second classification output to determine whether or not the first image is an adversarial image; and
initiate, in response to a determination that the first image is an adversarial image, performance of a mitigation operation.

12. The computer program product of claim 11, wherein:
the at least one machine learning computer model comprises a first machine learning computer model to process the input data representing the first image and a second machine learning computer model to process the at least one second image,
the first machine learning computer model and second machine learning computer model are trained independently of each other, and
the first machine learning computer model is trained on a training dataset comprising training images, and the second machine learning computer model is trained on cohorts of similar images that are visually similar to corresponding ones of the training images in the training dataset.

13. The computer program product of claim 11, wherein identifying at least one second image comprises generating a cohort of one or more second images that are visually similar to the first image, and wherein generating the cohort comprises, for each image in the image repository, determining a measure of similarity between the image and the input image by calculating at least one of a similarity metric or distance metric.

14. The computer program product of claim 11, wherein the at least one machine learning computer model comprises a deep learning neural network that is configured to perform an image classification operation in support of an image recognition operation performed by a cognitive computing system.

15. The computer program product of claim 11, wherein the mitigation operation comprises at least one of sending a notification communication to an administrator computing device, wherein the notification message comprises data indicating features of the adversarial image, or logging the adversarial image and the features of the adversarial image in a log data structure.

16. The computer program product of claim 11, wherein the mitigation operation comprises discarding results of the at least one machine learning computer model processing of the input data prior to the results being processed by a downstream computing system and sending a request to a source computing device from which the input data is received requesting that the source computing device provide different input data.

17. The computer program product of claim 11, wherein the mitigation operation comprises logging the adversarial image and features of the adversarial image in a log entry of a log data structure, and evaluating one or more log entries in the log data structure to determine if a threshold number of adversarial input images are received from a same source computing device, and blocking further inputs from that source computing device in response to the threshold number of adversarial input images from the source computing device being reached or exceeded.

18. The computer program product of claim 11, wherein the mitigation operation comprises automatically performing a purification operation to modify the first image represented by the input data to minimize perturbations in the input data corresponding to a discriminative region of the first image.

19. The computer program product of claim 11, wherein the at least one machine learning computer model comprises a cohort-based machine learning computer model that processes the at least one second image to generate the second classification output, wherein the cohort based machine learning computer model is one of a plurality of cohort-based machine learning computer models, each cohort-based machine learning computer model in the plurality of cohort-based machine learning computer models processing a different one of the one or more second images, wherein generating the second classification operation comprises performing a fusion operation on outputs from the plurality of cohort-based machine learning computer models to generate a single second classification output.

20. An apparatus comprising:
at least one processor; and
at least one memory coupled to the at least one processor, wherein the at least one memory comprises instructions which, when executed by the at least one processor, cause the at least one processor to implement a machine learning computer model, the at least one processor operating to:
process, by the machine learning computer model, input data representing a first image to generate a first classification output;
identify at least one second image having similar characteristics to the first image based on a comparison of characteristics of the first image to characteristics of images in an image repository;
process, by the machine learning computer model, the at least one second image to generate a second classification output;
compare the first classification output to the second classification output to determine whether or not the first image is an adversarial image; and
initiate, in response to a determination that the first image is an adversarial image, performance of a mitigation operation.

* * * * *